US011333788B2

(12) United States Patent
Bhardwaj et al.

(10) Patent No.: US 11,333,788 B2
(45) Date of Patent: *May 17, 2022

(54) DETERMINING THE LOCATION OF A MID-LATERAL POINT OF A HORIZONTAL WELL

(71) Applicant: Halliburton Energy Services, Inc., Houston, TX (US)

(72) Inventors: Manisha Bhardwaj, Houston, TX (US); Dwight David Fulton, Cypress, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 145 days.

This patent is subject to a terminal disclaimer.

(21) Appl. No.: 16/756,410

(22) PCT Filed: Dec. 28, 2017

(86) PCT No.: PCT/US2017/068649
§ 371 (c)(1),
(2) Date: Apr. 15, 2020

(87) PCT Pub. No.: WO2019/132909
PCT Pub. Date: Jul. 4, 2019

(65) Prior Publication Data
US 2020/0319368 A1   Oct. 8, 2020

(51) Int. Cl.
*E21B 47/00* (2012.01)
*G01V 3/34* (2006.01)
*E21B 7/04* (2006.01)
*E21B 47/024* (2006.01)
(Continued)

(52) U.S. Cl.
CPC ............ *G01V 3/34* (2013.01); *E21B 7/046* (2013.01); *E21B 47/024* (2013.01);
(Continued)

(58) Field of Classification Search
CPC .. G01V 3/34; G01V 3/18; E21B 7/046; E21B 47/024; E21B 47/026; E21B 47/09; E21B 47/022
See application file for complete search history.

(56) References Cited

U.S. PATENT DOCUMENTS

2003/0154029 A1 * 8/2003 Metrick ................... G01V 1/40
702/6
2009/0125280 A1   5/2009 Soliman et al.
(Continued)

FOREIGN PATENT DOCUMENTS

WO    2015112160    7/2015
WO    2017132098    8/2017

OTHER PUBLICATIONS

ISRWO International Search Report and Written Opinion for PCT/US2017/068649 dated Sep. 20, 2018.
(Continued)

*Primary Examiner* — Mohamed Charioui
*Assistant Examiner* — Christine Y Liao
(74) *Attorney, Agent, or Firm* — John Wustenberg; C. Tumey Law Group PLLC

(57) ABSTRACT

A wellbore trajectory survey, having an ordered plurality of survey points, is acquired. Each of the plurality of survey points has a measured depth, an inclination, and a geographic location of the point in the wellbore corresponding to the survey point. The wellbore trajectory survey is ordered on measured depth. The processor identifies a minimum lateral measured depth (min_LMD), a maximum lateral measured depth (max_LMD). The processor identifies a mid-lateral point (mid_LMP) in the plurality of survey points whose measured depth (mid_LMD) is greater than min_LMD and less than max_LMD.

18 Claims, 13 Drawing Sheets

(51) Int. Cl.
*E21B 47/026* (2006.01)
*E21B 47/09* (2012.01)
*G01V 3/18* (2006.01)
*E21B 47/022* (2012.01)

(52) U.S. Cl.
CPC .......... E21B 47/026 (2013.01); E21B 47/09 (2013.01); G01V 3/18 (2013.01); *E21B 47/022* (2013.01)

(56) References Cited

U.S. PATENT DOCUMENTS

| | | |
|---|---|---|
| 2014/0238690 A1 | 8/2014 | Armistead |
| 2015/0286954 A1 | 10/2015 | Maucec et al. |
| 2017/0211372 A1 | 7/2017 | Samuel |
| 2017/0218739 A1 | 8/2017 | Dallas |
| 2018/0052903 A1 | 2/2018 | Mercado et al. |
| 2018/0306019 A1* | 10/2018 | Saponja ............ B01D 19/0042 |
| 2019/0010790 A1 | 1/2019 | Stephenson et al. |

OTHER PUBLICATIONS

LaFollette, R. F., Izadi, G., & Zhong, M. (2014). Application of Multivariate Statistical Modeling and Geographic Information Systems Pattern-Recognition Analysis to Production Results in the Eagle Ford Formation of South Texas. SPE Hydraulic Fracturing Technology Conference.

Zhong, M., Schuetter, J., Mishra, S., & Lafollette, R. F. (2015). Do Data Mining Methods Matter?: A Wolfcamp Shale Case Study. SPE Hydraulic Fracturing Technology Conference.

Mishra, S., Schuetter, J., Zhong, M., & Lafollette, R. (2015). Data Analytics for Production Optimization in Unconventional Reservoirs. Proceedings of the 3rd Unconventional Resources Technology Conference.

Browning, S., & Jayakumar, R. (2016). Effects of Toe-Up Vs Toe-Down Wellbore Trajectories on Production Performance in the Cana Woodford. Proceedings of the 4th Unconventional Resources Technology Conference.

* cited by examiner

DETERMINING THE LOCATION OF A MID-LATERAL POINT OF A HORIZONTAL WELL

BACKGROUND

There is an ongoing effort in the hydrocarbon industry to explain and improve well production through an understanding of the factors affecting well production. These factors include a wide variety of reservoir and well treatment parameters, as well as parameters related to a physical well and its wellbore(s). Conventionally, wells have been characterized by trajectory surveys that include surface location (i.e., the location where the well's wellbore penetrates the surface of the earth), inclination angle over depth, azimuth over depth, and generalized overall wellbore inclination angle, often referred to as toe angle. Further, there are often multiple trajectory surveys that can be correlated with each wellbore. Some of these trajectory surveys are inconsistent with each other. Reconciling the inconsistent data to produce survey data useful to support the new efforts and to assist in evaluating well production is a challenge.

DETAILED DESCRIPTION

Figure 1A:
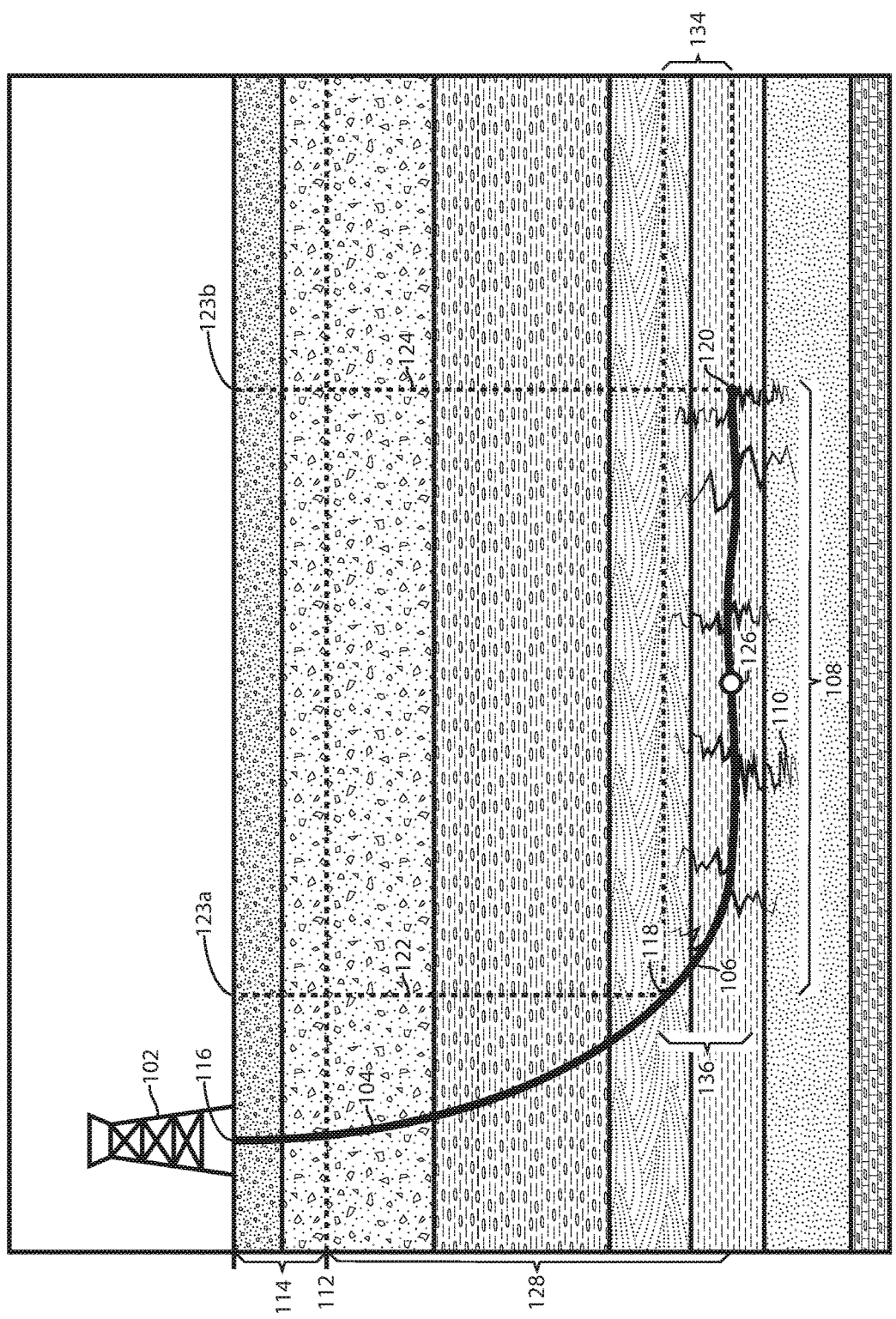
FIG. 1A is a cross-sectional view of a well with a lateral portion.

The following detailed description illustrates embodiments of the present disclosure. These embodiments are described in sufficient detail to enable a person of ordinary skill in the art to practice these embodiments without undue experimentation. It should be understood, however, that the embodiments and examples described herein are given by way of illustration only, and not by way of limitation. Various substitutions, modifications, additions, and rearrangements may be made that remain potential applications of the disclosed techniques. Therefore, the description that follows is not to be taken as limiting on the scope of the appended claims. In particular, an element associated with a particular embodiment should not be limited to association with that particular embodiment but should be assumed to be capable of association with any embodiment discussed herein.

FIG. 1 is a cross-sectional view of a well with a lateral portion. The well 102, which may be land-based or sea-based, includes a surface structure 102, such as a derrick or wellhead, and a wellbore 104. The wellbore 104 includes a lateral portion 106 that has a lateral length 108. In one or more embodiments, the wellbore 104 has been fractured, as indicated by the fracture lines 110.

Sea level 112 is indicated by a dashed line. The reference elevation 114 is the distance from the surface location 116 of the wellbore 104 to sea level 112.

A first lateral point 118 is the first point in the wellbore 104 where the inclination (i.e., the tilt of the wellbore 104 with respect to vertical) exceeds an inclination threshold angle. A last lateral point 120 is the last point in the wellbore 104 where the inclination exceeds the inclination threshold angle. In one or more embodiments, the last lateral point 120 is the last point in the wellbore 104. In one or more embodiments, the last lateral point 120 is not the last point in the wellbore 104.

The true vertical depth (TVD) 122 of the first lateral point 118 is the distance from the first lateral point 118 to the surface 123a vertically above the first lateral point 118. The TVD 124 of the last lateral point 120 is the distance from the last lateral point 120 to the surface 123b vertically above the last lateral point 120.

A mid-lateral point 126 is generally defined as the midpoint of the lateral portion 106 of the wellbore. More specific definitions of mid-lateral point 126 are provided below. A sub-sea TVD 128 of, for example, the mid-lateral point 126 is defined as the vertical distance from mid-lateral point 126 to sea level 112.

Figure 1D:
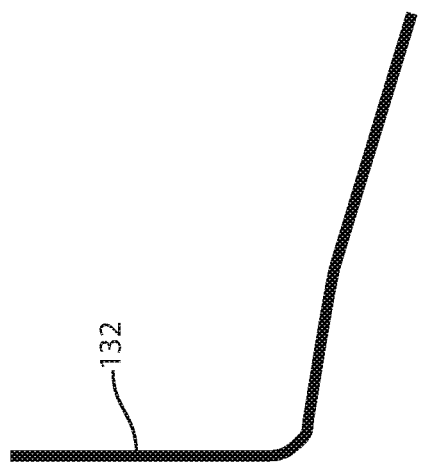
FIG. 1D is a cross-sectional view of a toe down borehole.
Figure 1C:
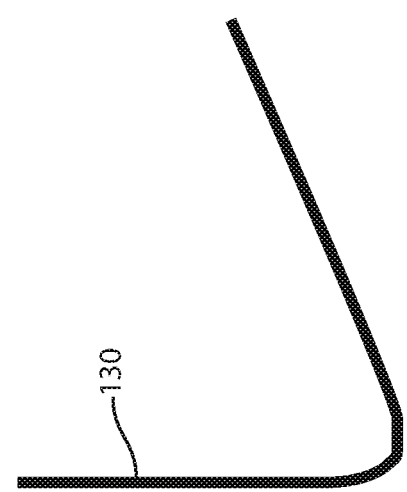
FIG. 1C is a cross-sectional view of a toe up wellbore.
Figure 1B:
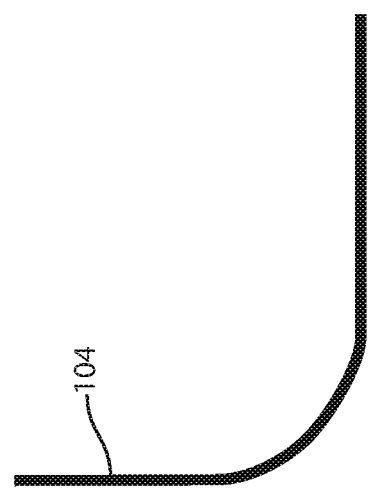
FIG. 1B is cross-sectional view of a wellbore with a flat toe.

FIG. 1B is cross-sectional view of a wellbore with a flat toe. FIG. 1C is a cross-sectional view of a toe up wellbore. FIG. 1D is a cross-sectional view of a toe down borehole. The toe position of the wellbore 104 may be flat as illustrated in FIG. 1B, toe up, for the borehole 130 shown in FIG. 1C, or toe down, for the borehole 132 shown in FIG. 1D.

The TVD lateral difference 134 is the difference between the TVD 122 of the first lateral point 118 and the TVD 124 of the last lateral point 118. The inclination variance 136 is the standard deviation of the inclination of the –lateral length 108 between the first lateral point 118 and the last lateral point 120.

The measured depth of a point in the borehole is the measured distance along the borehole 104 from the surface location 116 of the wellbore 104 to the survey point.

A wellbore 104, such as that shown in FIG. 1, maybe represented by a trajectory survey such as that shown in Table 1:

TABLE 1

| Measured Depth (ft) | Inclination (deg) | Azimuth (deg) | True Vertical Depth (ft) | Northing +N/−S (ft) | Easting +E/−W (ft) | Latitude (deg) | Longitude (deg) |
|---|---|---|---|---|---|---|---|
| 100 | 0 | 0 | 100 | 0.00 | 0.00 | 40.49499 | −104.31695 |
| 200 | 0 | 0 | 200 | 0.00 | 0.00 | 40.49499 | −104.31695 |
| 300 | 0 | 0 | 300 | 0.00 | 0.00 | 40.49499 | −104.31695 |
| 400 | 0 | 0 | 400 | 0.00 | 0.00 | 40.49499 | −104.31695 |
| 500 | 0 | 0 | 500 | 0.00 | 0.00 | 40.49499 | −104.31695 |
| 600 | 0 | 0 | 600 | 0.00 | 0.00 | 40.49499 | −104.31695 |
| 700 | 0 | 0 | 700 | 0.00 | 0.00 | 40.49499 | −104.31695 |
| 800 | 0 | 0 | 800 | 0.00 | 0.00 | 40.49499 | −104.31695 |
| 900 | 2 | 334.33 | 899.98 | 1.57 | −0.76 | 40.49500 | −104.31695 |
| 1000 | 4 | 334.33 | 999.84 | 6.29 | −3.02 | 40.49501 | −104.31696 |
| . . . | | | | | | | |
| 6600 | 65.95 | 90.04 | 6440.56 | 540.78 | 22.90 | 40.49648 | −104.31685 |
| 6700 | 77.95 | 90.04 | 6471.49 | 540.71 | 117.80 | 40.49648 | −104.31651 |
| 6800 | 89.95 | 90.04 | 6482.01 | 540.64 | 217.06 | 40.49647 | −104.31616 |
| 6900 | 90.4 | 90.04 | 6481.33 | 540.57 | 317.06 | 40.49647 | −104.31579 |
| 7000 | 90.4 | 90.04 | 6480.64 | 540.50 | 417.06 | 40.49647 | −104.31544 |
| 7100 | 90.4 | 90.04 | 6479.94 | 540.44 | 517.05 | 40.49647 | −104.31508 |
| 7200 | 90.4 | 90.04 | 6479.24 | 540.37 | 617.05 | 40.49647 | −104.31472 |
| 7300 | 90.4 | 90.04 | 6478.55 | 540.30 | 717.05 | 40.49646 | −104.31436 |
| 7400 | 90.4 | 90.04 | 6477.85 | 540.23 | 817.05 | 40.49646 | −104.31400 |
| 7500 | 90.4 | 90.04 | 6477.15 | 540.16 | 917.04 | 40.49646 | −104.31364 |
| 7600 | 90.4 | 90.04 | 6476.46 | 540.09 | 1017.04 | 40.49646 | −104.31328 |
| 7700 | 90.4 | 90.04 | 6475.76 | 540.02 | 1117.04 | 40.49646 | −104.31292 |
| 7800 | 90.4 | 90.04 | 6475.07 | 539.95 | 1217.04 | 40.49645 | −104.31256 |
| 7900 | 90.4 | 90.04 | 6474.37 | 539.89 | 1317.03 | 40.49645 | −104.31220 |
| 8000 | 90.4 | 90.04 | 6473.67 | 539.82 | 1417.03 | 40.49645 | −104.31184 |
| . . . | | | | | | | |
| 13100 | 90.4 | 90.04 | 6438.16 | 536.31 | 6516.91 | 40.49633 | −104.29350 |
| 13200 | 90.4 | 90.04 | 6437.46 | 536.24 | 6616.90 | 40.49632 | −104.29313 |
| 13300 | 90.4 | 90.04 | 6436.77 | 536.17 | 6716.90 | 40.49632 | −104.29278 |
| 13400 | 90.4 | 90.04 | 6436.07 | 536.10 | 6816.90 | 40.49631 | −104.29241 |
| 13500 | 90.4 | 90.04 | 6435.37 | 536.04 | 6916.90 | 40.49631 | −104.29206 |
| 13600 | 90.4 | 90.04 | 6434.68 | 535.97 | 7016.89 | 40.49631 | −104.29169 |
| 13700 | 90.4 | 90.04 | 6433.98 | 535.90 | 7116.89 | 40.49631 | −104.29134 |
| 13800 | 90.4 | 90.04 | 6433.29 | 535.83 | 7216.89 | 40.49630 | −104.29097 |
| 13900 | 90.4 | 90.04 | 6432.59 | 535.76 | 7316.89 | 40.49630 | −104.29062 |
| 14000 | 90.4 | 90.04 | 6431.89 | 535.69 | 7416.88 | 40.49630 | −104.29025 |
| 14100 | 90.4 | 90.04 | 6431.2 | 535.62 | 7516.88 | 40.49630 | −104.28990 |
| 14128.16 | 90.4 | 90.04 | 6431 | 535.60 | 7545.04 | 40.49630 | −104.28979 |

As can be seen, the example trajectory survey illustrated in Table 1 includes numerous survey points, each of which is represented by a row in Table 1. Some of the survey points have been omitted for simplicity of presentation. The omitted survey points are represented by ellipses in the table.

Each of the survey points in the example trajectory survey illustrated in Table 1 includes, a measured depth, an inclination, an azimuth (i.e. the direction of the wellbore in a horizontal plane relative to true north), a TVD, a Northing value (which is the offset distance (in feet) of the survey point from the surface location in the North (+) or South (−) direction), an Easting value (which is the offset distance (in feet) of the survey point from the surface location in the East (+) or West (−) direction), a latitude, and a longitude for that survey point. One or more embodiments of a trajectory survey may not include all of the illustrated columns. One or more embodiments of a trajectory survey may contain other data, such as a unique number assigned to the wellbore by the American Petroleum Institute (API), and/or a unique number assigned by a custodian that maintains a library of trajectory surveys. In one or more embodiments, the data in the trajectory survey may not be complete. That is, in some trajectory surveys, the data in some of the cells shown in Table 1 may be missing or corrupt.

Data regarding wellbores may include factors extracted from public sources or private sources. Such data may include well surface location (latitude and longitude), fracture chemistry parameters, frac job parameters, inclination (or depth) angle, azimuth, toe orientation.

A given wellbore, such as wellbore 104, may be associated with a plurality of trajectory surveys. The association may be by API number, the number assigned by a custodian of trajectory surveys, the well surface location, or other similar factors. The association may be incorrect. That is, the association between a trajectory survey and a wellbore 104 may be faulty because of inaccuracy, mislabeling, or the like.

Figure 2:
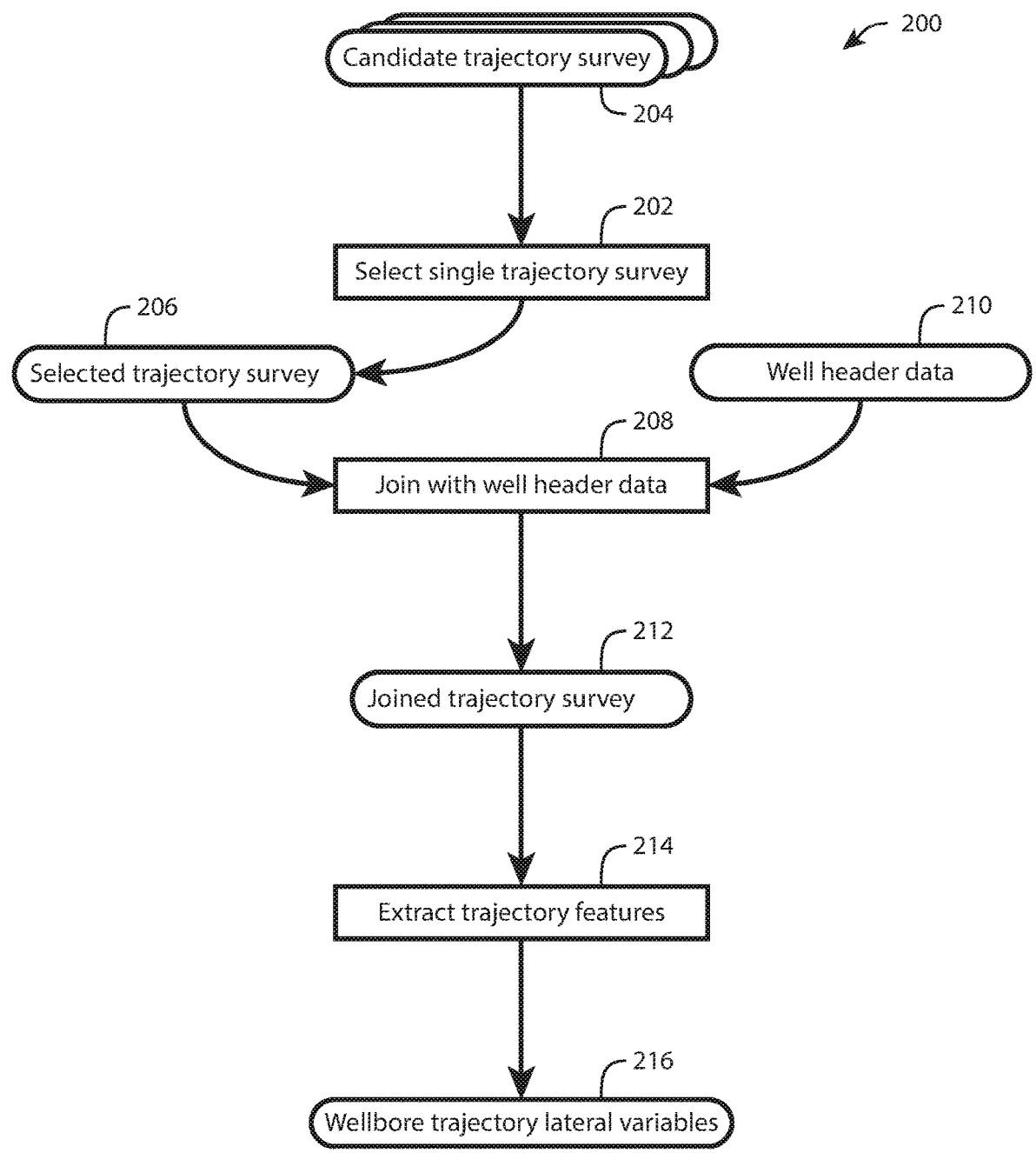
FIG. 2 is a flow chart of a process for processing, cleaning, and extracting standard and engineered features from a plurality of trajectory surveys.

FIG. 2 is a flow chart of a process performed by a computer, having a processor, a memory, input/output devices such as keyboards, tablets, pointing devices, monitors, and storage devices, for processing, cleaning, and extracting standard and engineered features from a plurality of trajectory surveys. A process 200 for processing, cleaning, and extracting standard and engineered features from a plurality of trajectory surveys (which together may have millions of survey points) includes selecting a single trajectory survey (block 202) from a plurality of candidate trajectory surveys 204 (if multiple surveys have been performed for the wellbore 104) to produce a selected trajectory survey 206. The selected trajectory survey 206 is joined (block 208) with well header data 210, some of which may be extracted from public sources and some of which may be extracted from private or proprietary sources, to produce a joined trajectory survey 212. Trajectory features are then extracted (block 214) from the joined trajectory survey 212, using data processing, cleaning, and quality checking procedures, to produce wellbore trajectory lateral variables (block 216).

Figure 3:
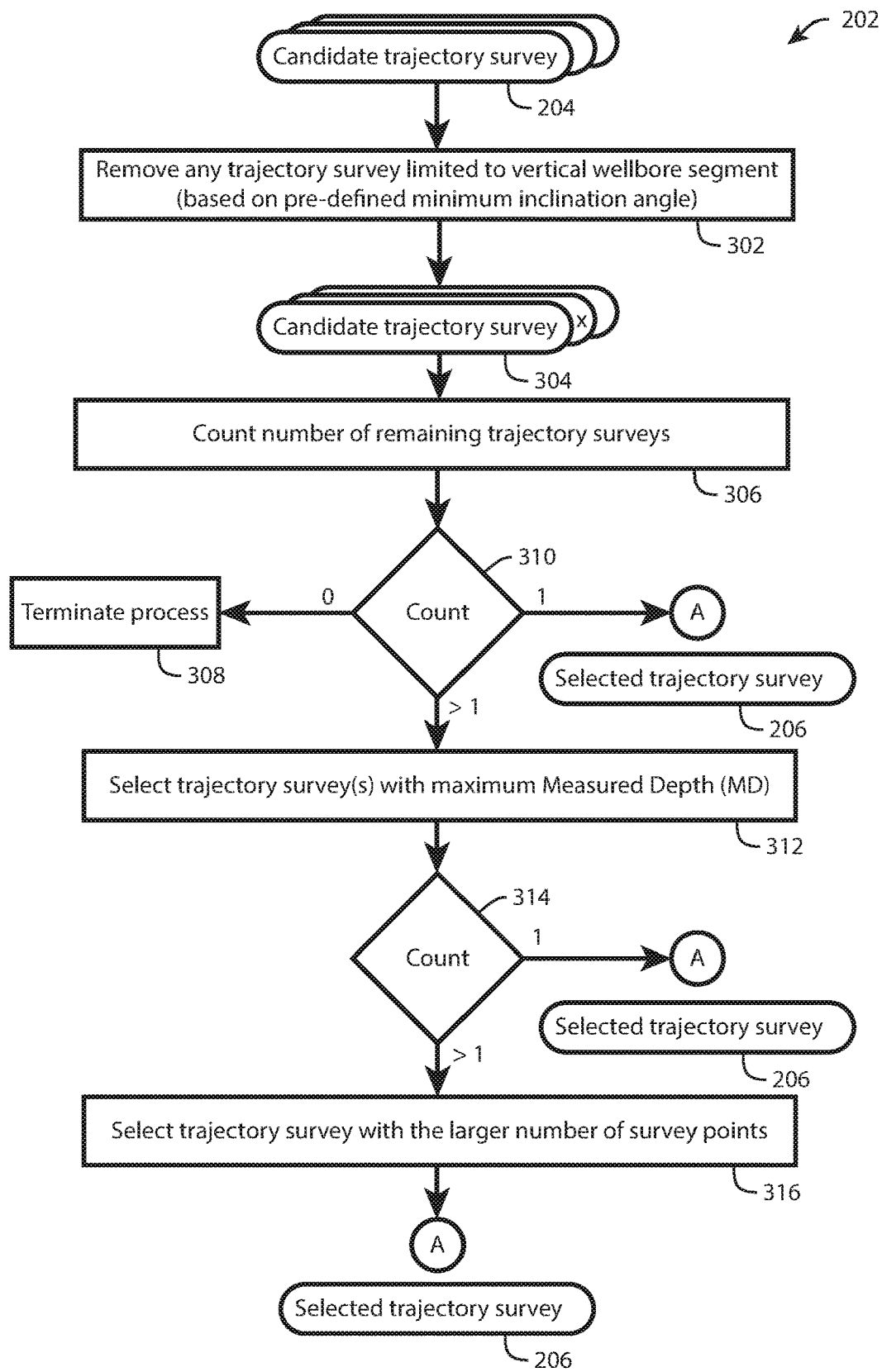
FIG. 3 is a flow chart of a process for selecting a wellbore trajectory survey for a well.

FIG. 3 is a flow chart of a process for selecting a wellbore trajectory survey for a well. In one or more embodiments, the process of selecting a single trajectory survey (block 202) from a plurality of candidate trajectory surveys 204 includes acquiring the plurality of candidate trajectory surveys 204 for the wellbore. As previously mentioned, the candidate trajectory surveys 204 can be gathered from public sources or private/proprietary sources. Any candidate trajectory survey limited to a vertical wellbore segment is removed as a candidate (block 302). The removed candidate trajectory survey is indicated by an "x" among the filtered candidate trajectory surveys 304.

In one or more embodiments, a candidate trajectory survey is determined to be limited to a vertical wellbore segment if it does not have a horizontal_section_number of survey points consecutive in measured depth with an inclination greater than an inclination threshold angle. In one or more embodiments, the number of survey points in the horizontal section, i.e., horizontal_section_number may be adjusted for convenience and is typically about 10 points. The inclination threshold angle may be adjusted and is typically around 88 degrees but may range from 80-85 degrees, from 78-88 degrees, or from 75-90 degrees. For example, a candidate trajectory survey may be removed if it has a very small number, e.g. less than 10, of survey points consecutive in measured depth (i.e., in the order shown in Table 1) with an inclination exceeding the inclination threshold angle. In one or more embodiments, a non_horizontal_number of survey points having inclinations that are not greater than the inclination threshold angle may be intermixed with the horizontal_section_number of survey points without triggering removal, to allow for slight deviations from horizontal or corrupt data. In one or more embodiments, the non_horizontal_number of survey points is 10-15 percent, 8-18 percent, or 5 to 20 percent of the horizontal_section_number. In one or more embodiments, the non_horizontal_number of survey points may be adjusted by a user in real time as a mechanism to refine the quality of the remaining candidate trajectory surveys.

The number of remaining trajectory surveys is counted (block 306) and, in one or more embodiments, the process is terminated (block 308) if the count is 0 ("0" branch from block 310). If the count is 1 ("1" branch from block 310), the remaining trajectory survey is selected as the selected trajectory survey 206. If the count is greater than 1 (">1" branch from block 310), the trajectory survey or surveys with the maximum measured depth is/are selected (block 312). Two or more trajectory surveys may be selected if they have the same maximum measured depth.

The number of remaining trajectory surveys is counted (block 314). If the count is 1 ("1" branch from block 314), the remaining trajectory survey is selected as the selected trajectory survey 206. If the count is greater than 1 (">1" branch from block 314), the trajectory survey with the largest number of survey points is selected (block 316) as the selected trajectory survey 206.

In one or more embodiments, rather than winnowing the trajectory surveys as shown in blocks 312 and 316, the trajectory surveys remaining after block 302 are joined, using a Structured Query Language (SQL) join for example, to produce an enhanced and rich data set. Similarly, in one or more embodiments, the remaining trajectory surveys after block 312 are joined together to produce an enhanced and rich data set.

Figure 4:
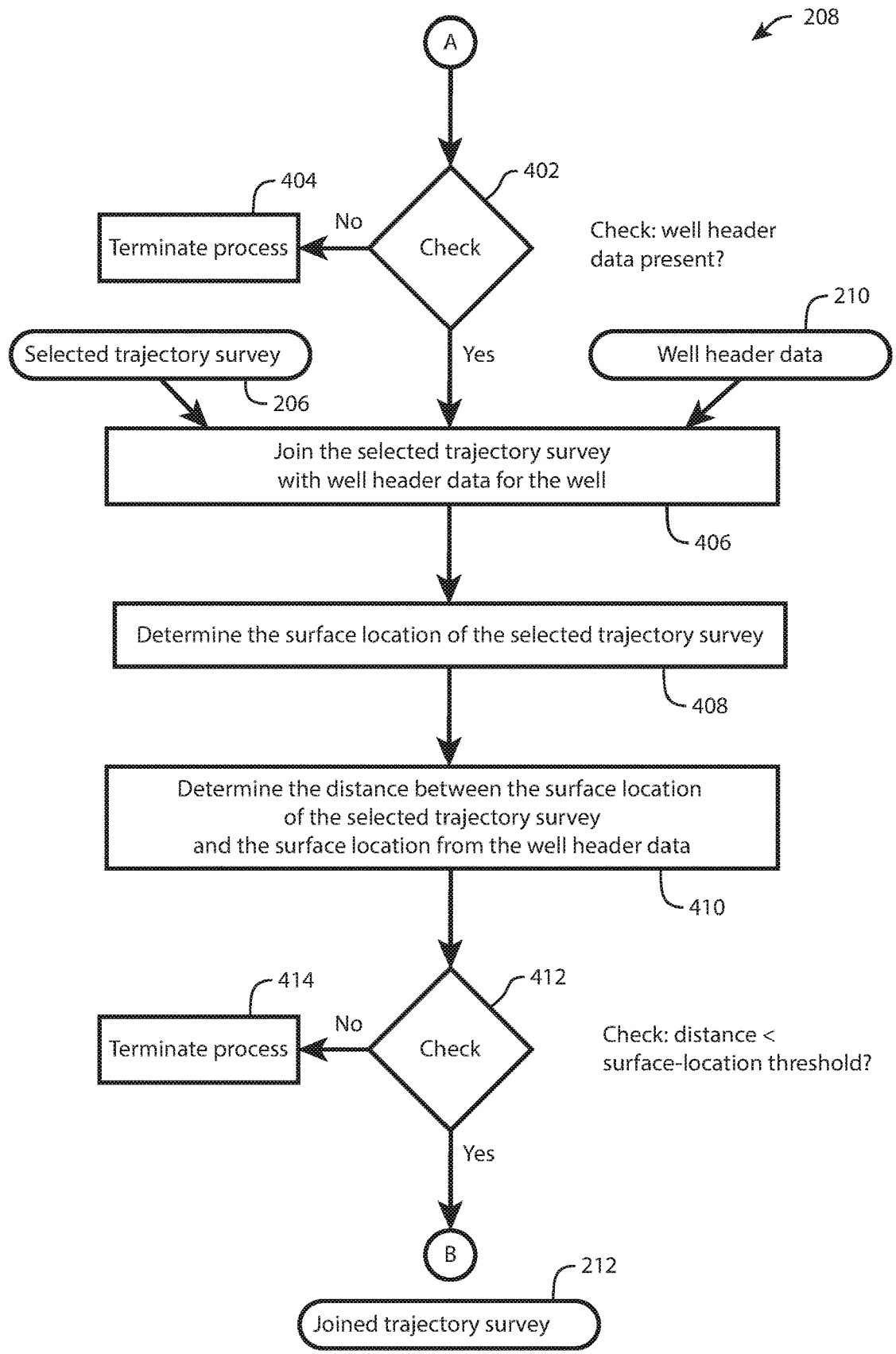
FIG. 4 is a flow chart of a process for joining the selected wellbore trajectory survey with well header data.

The "1" branch from block 310, the "1" branch from block 314, and the output from block 316 proceed to connector "A," which links to the same connector on FIG. 4.

FIG. 4 is a flow chart of a process for joining the selected wellbore trajectory survey with well header data. The process of joining the selected trajectory survey 206 with the well header data 210 (block 208) includes checking to see if well header data is present (block 402). If well header data is not present ("No" branch from block 402), the process terminates (block 404). If well header data is present ("Yes" branch from block 402), the selected trajectory survey 206 is joined with the well header data (block 406). In one or more embodiments, the join is a SQL join that exploits commonality between the selected trajectory survey 206 and the well header data 210. In one or more embodiments, the join is a simple combination of the data in the selected trajectory survey 206 and the well header data 210. In one or more embodiments, the well header data 210 includes perforation data that describes where the to borehole is perforated. For example, in the wellbore illustrated in Table 1 the location of the upper perf might be 9626 feet (2934 meters) and the location of the lower perf might be 14050 feet (4282 meters), yielding a perforated length of the wellbore=14050−9626=4424 feet (1348 meters).

The process continues by determining a geographic location of the survey point where the selected trajectory survey shows the wellbore 104 penetrating the surface (block 408). In one or more embodiments, this point is the trajectory-surface point in the selected trajectory survey 206 for which the measured depth is zero. In one or more embodiments, the trajectory-surface point is the first point in the selected trajectory survey 206 for which the measured depth is within 33 feet (10 meters) of zero and inclination angle not exceeding 15 degrees.

The process continues by determining a geographic location of a header-surface location in the well header data 210. In some cases, the well header data 210 contains a field that contains the geographic location of a header-surface location. In other cases, the location of a header-surface location is interpolated or extrapolated, such as from legal location information (e.g., section, town, and range) from data in the well header data 210.

The process continues by determining the distance between the surface location of the selected trajectory survey and the location of the header-surface location (block 410). If determined distance is greater than a surface-location threshold ("No" branch from block 412), the process terminates. If the determined distance is less than surface-location threshold ("No" branch from block 412), the process continues to connector B, which links to FIG. 5A. In one or more embodiments, the surface-location threshold is 33 feet (10 meters). In one or more embodiments, the surface-location threshold is (164 feet) 50 meters. In one or more embodiments, the surface-location threshold is (328 feet) 100 meters.

In one or more embodiments, the join (block 406) is performed at the end of this process (i.e. after the check 412)

rather than at the beginning. In either case, the output of the process is the joined trajectory survey 212.

Figure 5A:
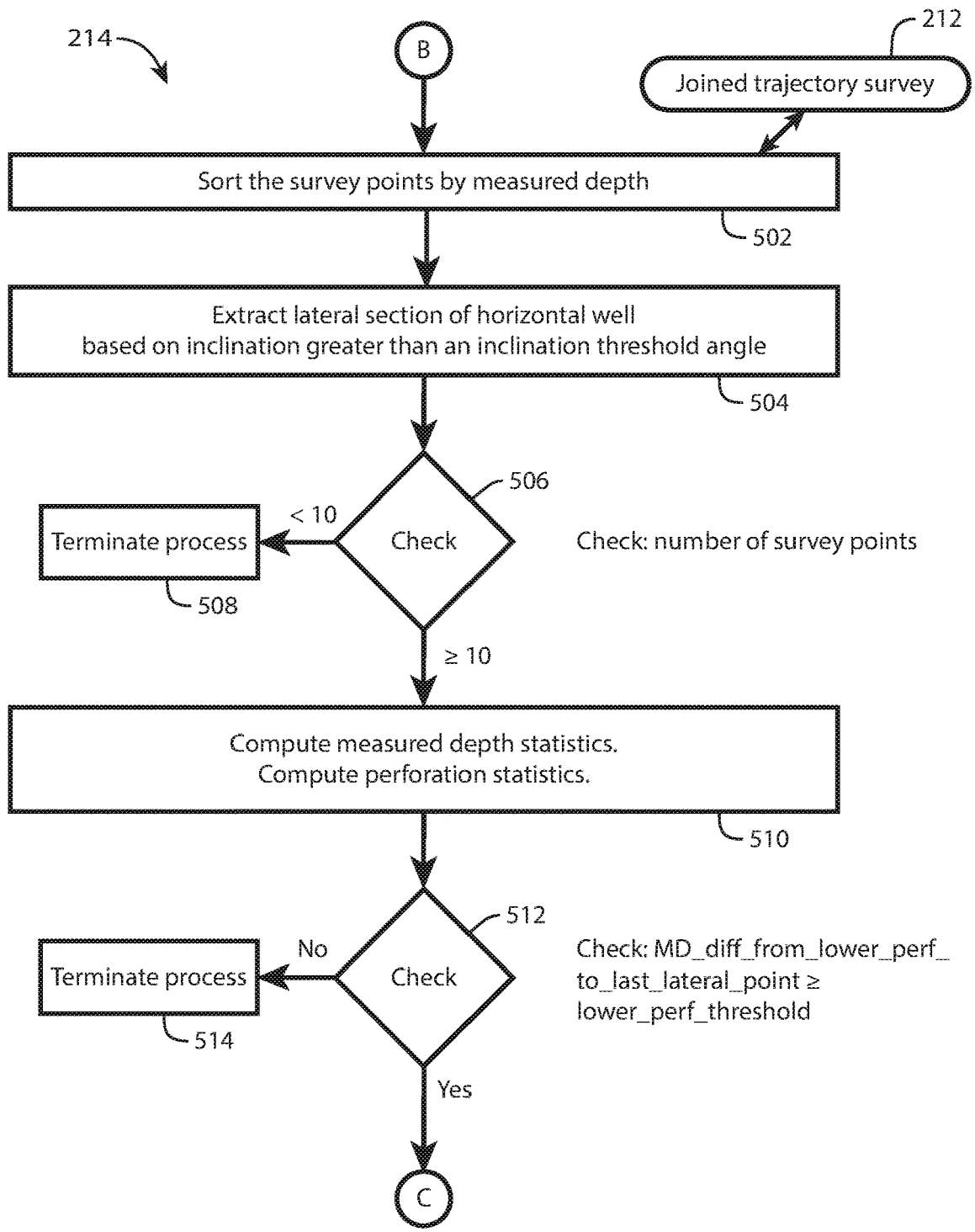
FIG. 5A is a flow chart of a first portion of a process for extracting features from a joined trajectory survey.

FIG. 5A is a flow chart of a first portion of a process for extracting features from a joined trajectory survey (block 214). The process includes sorting the survey points in the joined trajectory survey by measured depth (block 502). In one or more embodiments, this sorting may not be necessary if the joined trajectory survey 212 was sorted as part of the joining process or if the selected trajectory survey 206 was already sorted by measured depth. The result of the sorting is that the joined trajectory survey's records are in measured-depth order, like the order of the records in Table 1.

The lateral section of the wellbore 104 is then extracted based on an inclination greater than an inclination threshold angle (block 504). That is, the joined trajectory survey 212 is searched, using for example a SQL search, for survey points in which the inclination is greater than the inclination threshold angle (discussed above in connection with FIG. 3) and the result is identified as the lateral section of the horizontal well. In one or more embodiments, the lateral section of the horizontal well includes all survey points in the joined trajectory survey between a first point in the joined trajectory survey 212 having an inclination greater than the inclination threshold angle, which is sorted by measured depth, and a last point in the joined trajectory survey 212 having an inclination greater than the inclination threshold angle.

The number of survey points in the lateral section of the horizontal well is then checked (block 506). If the number is less than a lateral_section_size_threshold ("<10" branch from block 506), the process terminates (block 508). If the number is greater than or equal to a lateral_section_size_threshold ("≥10" branch from block 506) processing continues. In one or more embodiments, the lateral_section_size_threshold is 10. In one or more embodiments, the lateral_section_size_threshold is 20. In one or more embodiments, the lateral_section_size_threshold is 50.

In one or more embodiments, processing continues by computing measured depth statistics and computing perforation statistics for the joined trajectory survey 212 (block 510).

In one or more embodiments, computing measured depth statistics (block 510) includes:
identifying a minimum lateral measured depth (min_LMD) as a measured depth of a first point in the ordered plurality of survey points in the joined trajectory survey 212 for which the inclination exceeds the inclination threshold angle,
identifying a maximum lateral measured depth (max_LMD) as a measured depth to a last point in the ordered plurality of survey points the joined trajectory survey 212 for which the inclination exceeds the inclination threshold angle,
computing MD_Std_Dev as the standard deviation of the measured depths of the survey points in the joined trajectory survey having measured depths≥min_LMD and ≤max_LMD,
computing lateral_length=max_LMD−min_LMD, In one or more embodiments, computing perforation statistics (block 510) includes:
setting upper_perf to a measured depth of a survey point having a minimum measured depth of a perforated set of survey points in the joined trajectory survey corresponding to a perforated section of the wellbore,
setting lower_perf to a measured depth of a survey point having a maximum measured depth of the perforated set of survey points in the joined trajectory survey,
setting flag_lower_perf as true if max_LMD−lower_perf<0 and otherwise flagging lower_perf as false,
setting flag_upper_perf as true if min_LMD−upper_perf>0 and otherwise flagging upper_perf as false,
setting MD_diff_from_upper_perf_to_first_lateral_point=upper_perf−min_LMD, and
setting MD_diff_from_lower_perf_to_last_lateral_point=lower_perf−max_LMD.

A check is performed to determine if MD_diff_from_lower_perf_to_last_lateral_point≥a lower_perf_threshold (block 512). If it is not ("No" branch from block 512), the process terminates (block 514). If it is ("Yes" branch from block 512), processing continues through connector C to FIG. 5B.

Figure 5B:
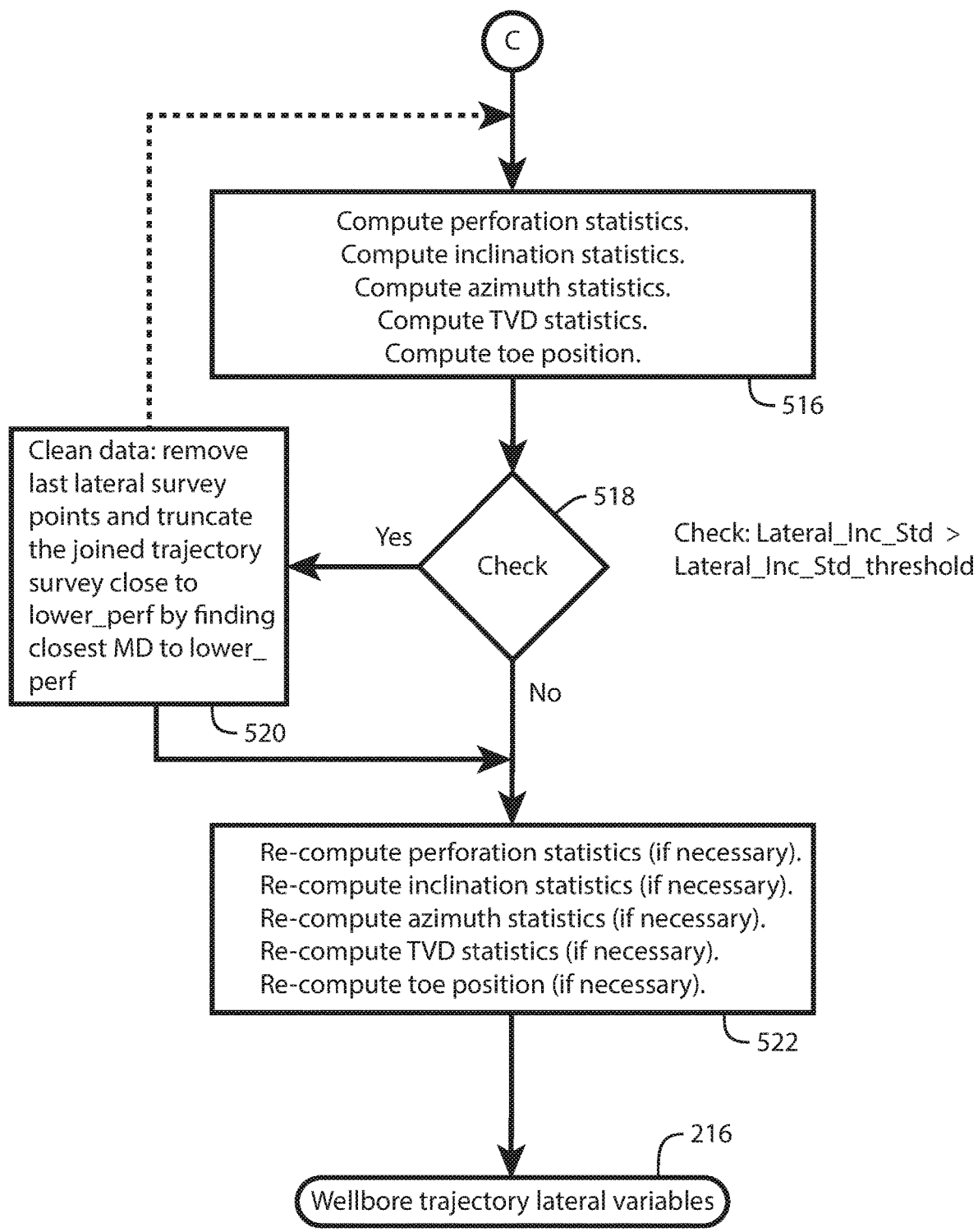
FIG. 5B is a flow chart of a second portion of a process for extracting features from a joined trajectory survey.

FIG. 5B is a flow chart of a second portion of the process for extracting features from a joined trajectory survey (block 214). Perforation statistics, inclination statistics, azimuth statistics, TVD statistics, and toe position are computed (block 516). Perforation statistics were discussed above in connection with block 510 (FIG. 5A). Perforation statistics may not be computed if the computation was done previously or on the first iteration of the optional loop described below in connection with the dashed arrow exiting block 520. In one or more embodiments, computing inclination statistics includes:
computing Lateral_Inc_Std as the standard deviation of the inclination of the survey points in the joined trajectory survey having measured depths≥min_LMD and ≤max_LMD (block 516),
computing a lateral_skewness of inclination (i.e., the asymmetry of a statistical distribution of inclination),
computing a lateral_kurtosis of inclination (i.e., the sharpness of the peak of the statistical distribution of inclination),
computing a lateral_average as the average inclination (i.e., the mean of the inclination values),
computing a lateral_25_quartile as the 25% quartile of inclination (i.e., the inclination value greater than 25 percent of the inclination values and less than 75 percent of the inclination values),
computing a lateral_50_quartile as the 50% quartile of inclination (i.e., the median of the inclination values),
computing a lateral_75_quartile as the 75% quartile of inclination (i.e., the inclination value greater than 75 percent of the inclination values and less than 25 percent of the inclination values), and
computing inc_diff_from_upper_perf_to_first_lateral=inclination for survey point having a measured depth equal to or closest to upper_perf−inclination for survey point having a measured depth equal to min_LMD.

Computing azimuth statistics includes:
computing lateral_az_avg=average of azimuths for survey points in the joined trajectory survey having measured depths≥min_LMD and ≤max_LMD, and
computing lateral_az_std=standard deviation of azimuths for survey points in the joined trajectory survey having measured depths≥min_LMD and ≤max_LMD.

Computing TVD statistics includes:
computing sub_sea_TVD (e.g., 128) for each survey point=true vertical depth (TVD) for the survey point—reference elevation 114 in FIG. 1,
computing Lateral_TVD_Std=standard deviation of TVD for survey points in the joined trajectory survey having measured depths≥min_LMD and ≤max_LMD, and computing Lateral_TVD_Diff=TVD for survey point having a measured depth equal to max_LMD−TVD for survey point having a measured depth equal to min_LMD.

Computing toe position includes computing toe_position as:

toe_up if Lateral_TVD_Diff<−toe_constant,
toe_down if Lateral_TVD_Diff>toe_constant, or
toe_flat
if−toe_constant<=Lateral_TVD_Diff<=toe_constant.

Toe_constant is defined as a threshold value for determining toe position. In one or more embodiments, it could be 10 feet (3 meters). In one or other embodiments, it could be 50 feet (15 meters).

In one or other embodiments, it could be 100 feet (30 meters).

A check is performed to determine if Lateral_Inc_Std>Lateral_Inc_Std_threshold (block 518).

If it is ("Yes" branch from block 518) the joined trajectory survey is cleaned, for example, by removing the last lateral survey points and truncating the joined trajectory survey close to lower perf by finding the closest measured depth to lower perf or by removing other bad data from the joined trajectory survey (block 520), if it is not ("No" branch from block 518) processing continues by (block 522):

re-computing perforation statistics, if necessary (i.e., if the data was cleaned in block 520), re-computing inclination statistics, if necessary (i.e., if the data was cleaned in block 520), re-computing azimuth statistics, if necessary (i.e., if the data was cleaned in block 520), re-computing TVD statistics, if necessary (i.e., if the data was cleaned in block 520), and re-computing toe position, if necessary (i.e., if the data was cleaned in block 520), The result is the wellbore trajectory lateral variables 216.

Figure 6A:
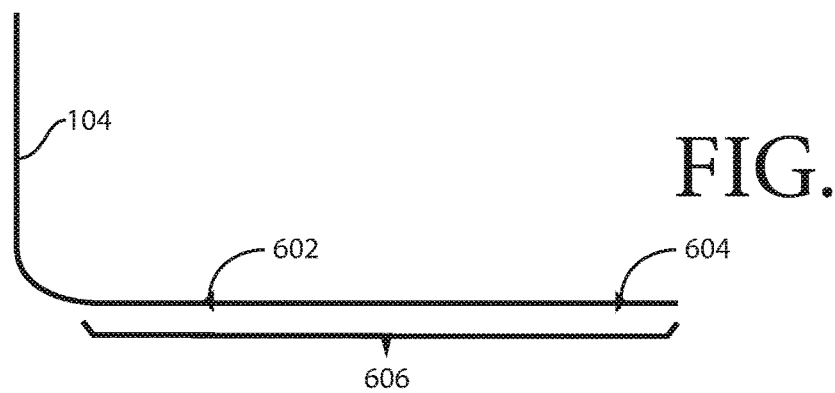
FIG. 6A is a cross-sectional view of a well that shows a first possible location of upper and lower perforations with respect to a lateral portion of a well.
Figure 6B:
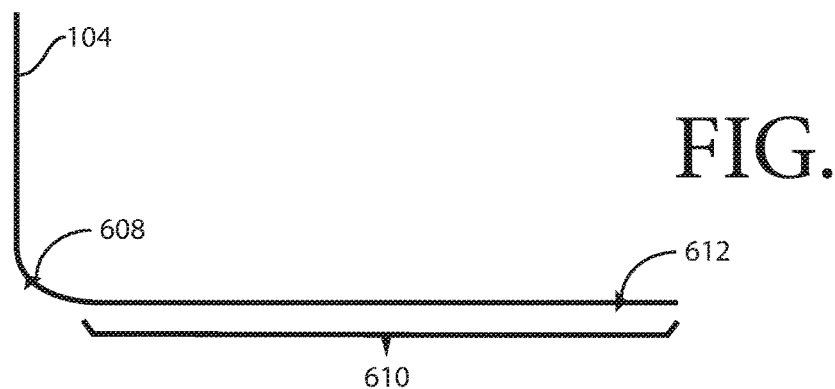
FIG. 6B is a cross-sectional view of a well that shows a second possible location of upper and lower perforations with respect to a lateral portion of a well.
Figure 6C:
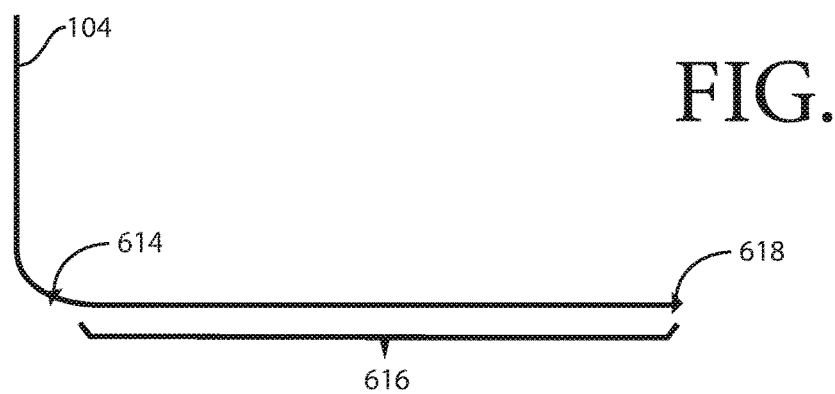
FIG. 6C is a cross-sectional view of a well that shows a third possible location of upper and lower perforations with respect to a lateral portion of a well.
Figure 6D:
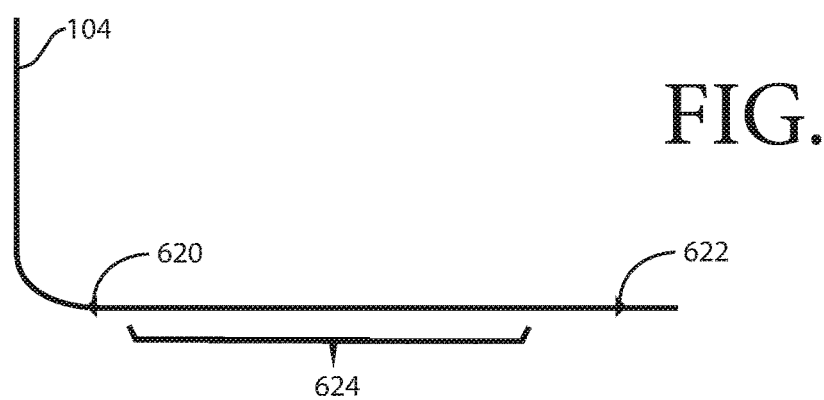
FIG. 6D is a cross-sectional view of a well that shows a fourth possible location of upper and lower perforations with respect to a lateral portion of a well.

FIG. 6A is a cross-sectional view of a well that shows first possible locations of upper and lower perforations with respect to a lateral portion of a well. FIG. 6B is a cross-sectional view of a well that shows second possible locations of upper and lower perforations with respect to a lateral portion of a well. FIG. 6C is a cross-sectional view of a well that shows third possible locations of upper and lower perforations with respect to a lateral portion of a well. FIG. 6D is a cross-sectional view of a well that shows fourth possible locations of upper and lower perforations with respect to a lateral portion of a well. FIGS. 6A-6D show the possible relationships between the perf survey points (i.e., lower_perf and upper_perf) and the extent of lateral section of the wellbore 104 and provide a backdrop for the reasons for blocks 510, 512, 514 and 516, 518, 520. It will be understood that there could be additional combinations of perforations placed on the lateral.

In FIG. 6A, the upper_perf 602 and the lower_perf 604 are within the lateral portion 606 of the wellbore 104.

In FIG. 6B, the upper_perf 608 lies outside the lateral portion 610 of the wellbore 104 and the lower_perf 612 lies inside the lateral portion 610 of the wellbore 104, which indicates that the perforations may have been done in the vertical or "build" section of the wellbore 104.

In FIG. 6C, the upper_perf 614 lies outside the lateral portion 616 of the wellbore 104 and the lower_perf 618 lies at the last survey point of the lateral portion 616 of the wellbore 104.

In FIG. 6D, the upper_perf 620 and the lower_perf 622 lie outside the lateral portion 624 of the wellbore 104, which may indicate insufficient trajectory survey data to perform computations.

The value MD_diff_from_upper_perf_to_first_lateral_point, computed in block 510, determines the distance in measured depth from the upper_perf to the upper-most lateral data point available in the trajectory survey. A large value of this parameter, such as may be seen in FIGS. 6B (608 to the uppermost part of lateral portion 610), 6C (614 to the uppermost part of lateral portion 616), and 6D (620 to the uppermost part of lateral portion 624), indicates that the upper perforations have been placed in the vertical or "build" section of the well. In such a case, there may be quality concerns in the trajectory survey because it will only correspond to a sub-section of the lateral portion of the wellbore 104 and not the overall perforated portion of the wellbore. Inversely, the same is true if the distance in measured depth from the lower_perf to the last lateral data point available in the trajectory survey, such as 622 and lowermost portion of 624 in FIG. 6D. For example, if the lower_perf of the wellbore 104 has a measured depth of 13400 feet (4084 meters) and the last survey point in the trajectory survey has a measured depth of 10200 feet (3108 meters), then the survey is not available for 3200 feet (975 meters) of lateral section (13400-10200) and confidence in the quality of the data in the trajectory survey will drop significantly. Consequently, if the MD_diff_from_lower_perf_to_last_lateral_point is greater than a threshold, i.e., lower_perf_threshold, which is checked in block 512, the process terminates in block 514. In one or more embodiments, lower_perf_threshold is −328 feet (100 meters). In one or more embodiments, lower_perf_threshold is −500 meters. In one or more embodiments, lower_perf_threshold is −3280 feet (1000 meters).

Lateral_Inc_Std, computed in block 516 (FIG. 5B) is the standard deviation of inclination along the lateral section of the wellbore 104. A value of Lateral_Inc_Std greater than a pre-defined threshold (Lateral_Inc_Std_threshold (which usually has a high value, such as 2, 4, or 5 degrees), indicates that the well has been drifting substantially from the flat line, moving in and out of target zone, or it could indicate problems with the quality of the data in the trajectory survey. In one or more embodiments, the Lateral_Inc_Std_threshold could be 20, 25, or 30 degrees. In the first case, this would indicate a case of porpoising discussed further below. In the second case, it could happen that there are some bad survey points in the trajectory survey indicated by a high value of Lateral_Inc_Std. In one or more embodiments, it is assumed that a few bad data points towards the end of the trajectory survey are affecting the standard deviation calculation. In one embodiment, those points are removed in block 520 by removing trajectory survey points after the last lower perforation point. In one or more embodiments, processing resumes with block 520 on the assumption that removing those points improves the quality of the data and, in particular, Lateral_Inc_Std. In one or more embodiments, the dashed path from block 520 is followed and Lateral_Inc_Std is recomputed. If Lateral_Inc_Std is still greater than Lateral_Inc_Std_threshold, block 520 performs a different data cleaning, such as removing all of the survey points with inclinations greater than a standard deviation away from the mean inclination in the lateral section of the wellbore 104 as adjusted in the previous iteration of block 520. In one or more embodiments, blocks 516, 518, and 520 repeat until Lateral_Inc_Std<Lateral_Inc_Std_threshold or until a threshold number of iterations (i.e., in one or more embodiments 3 iterations, in one or more embodiments 5 iterations, in one or more embodiments 10 iterations)

A mid-lateral point 126 (mid_LMP) and the measured depth of the mid_LMP, mid_LMD, may also be derived. The mid_LMD is defined to be the measured depth at the middle point along the lateral portion of the wellbore 104.

Figure 7:
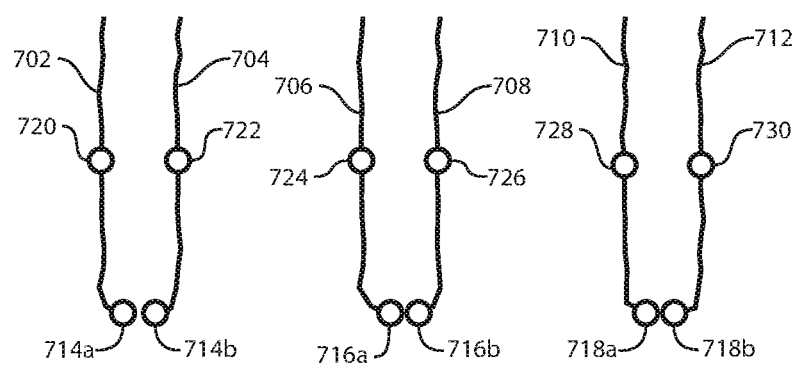
FIG. 7 is a top view of a plurality of lateral wells showing surface locations of the wells and locations of the mid-lateral points of the wells.

FIG. 7 is a top view of a plurality of lateral wells showing surface locations of the wells and locations of the mid-lateral points of the wells. Lateral wells 702, 704, 706, 708, 710, 712, start from a surface location 714a, 714b, 716a, 716b, 718a, and 718b that may have close proximity to each other. For example, surface location 714a is the surface location of lateral well 702, surface location 714b (which is close to surface location 714a) is the surface location of lateral well 704, surface location 716a is the surface location of lateral well 706, surface location 716b (which is close to surface location 716a) is the surface location of lateral well 708, surface location 718a is the surface location of lateral well 710, and surface location 718b (which is close to surface location 718a) is the surface location of lateral well 712.

The mid_LMP of the lateral wells 702, 704, 706, 708, 710, 712 is typically spaced away from the surface locations. That is, the mid_LMP of lateral well 702 is at location 720, the mid_LMP of lateral well 704 is at location 722, the mid_LMP of lateral well 706 is at location 724, the mid_LMP of lateral well 708 is at location 726, the mid_LMP of lateral well 710 is at location 728, and the mid_LMP of lateral well 712 is at location 730.

Figure 8:
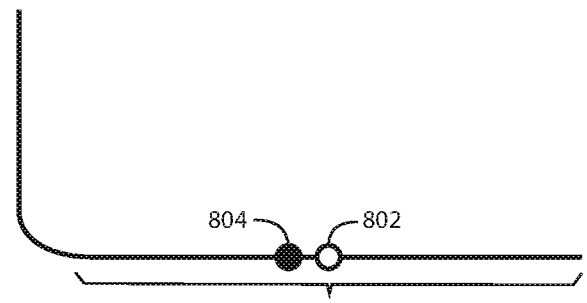
FIG. 8 is a cross-sectional view of a well showing a mid-lateral point and a location of a survey point closest to the mid-lateral point.

FIG. 8 is a cross-sectional view of a well showing a mid-lateral point and a location of a survey point closest to the mid-lateral point. The location of the mid_LMP may be defined by a calculated value, by the survey point closest in measured depth to the calculated mid_LMD, by the survey point having a measured depth that is closest to but less than the calculated mid_LMD, or having a measured depth that is closest to but greater than the calculated mid_LMP. FIG. 8 illustrates a calculated mid_LMD 802 and a mid_LMP 804 that has the measured depth that is closest to but less than the calculated mid_LMD.

Figure 9:
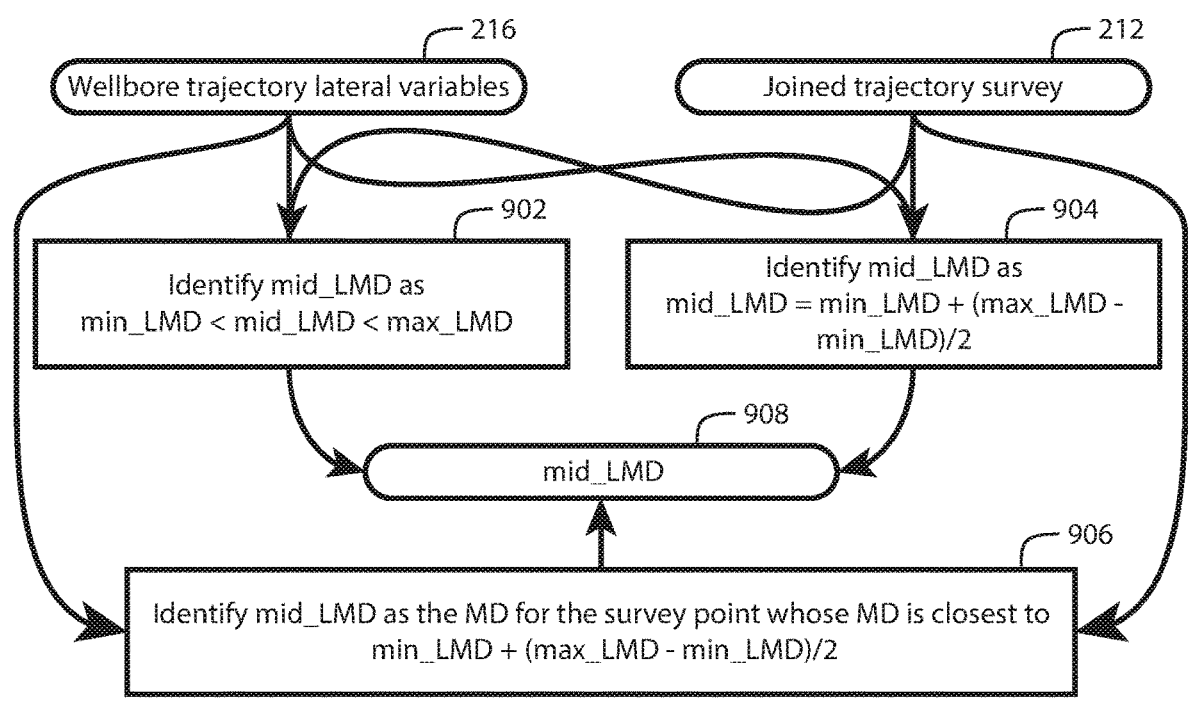
FIG. 9 is a flow chart showing several techniques for computing the mid-lateral location from the joined trajectory survey and the wellbore trajectory lateral variables.

FIG. 9 is a flow chart showing several techniques for computing the mid-lateral location from the joined trajectory survey 212 and the wellbore trajectory lateral variables 216. After it is computed, the mid-lateral location may be stored as one of the wellbore trajectory lateral variables 216 or in another data store. As can be seen, three techniques 902, 904, 906 are illustrated for computing mid_LMD 908.

In a first technique 902, mid_LMD 908 is defined to be between min_LMD and max_LMD, i.e., min_LMD<mid_LMD<max_LMD.

In a second technique 904, mid_LMD 908 is defined to be halfway between min_LMD and max_LMD, i.e., mid_LMD=min_LMD+(max_LMD−min_LMD)/2.

In a third technique 906, mid_LMD 908 is defined to be the measured depth of the survey point, i.e., the mid_LMP, whose measured depth is closest to min_LMD+(max_LMD−min_LMD)/2, which may be computed as follows: the measured depth produced by the function min (|measured depth−mid_LMD| for all survey points having measured depths≥min_LMD and ≤max_LMD), where "min" is the minimum function and "|x|" indicates the absolute value of "x."

It will be understood that other techniques for computing mid_LMD are possible. For example, mid_LMD 908 may be defined to be the measured depth of the survey point whose measured depth is closest to and less than min_LMD+(max_LMD−min_LMD)/2. As another example, mid_LMD 908 may be defined to be the measured depth of the survey point whose measured depth is closest to and greater than min_LMD+(max_LMD−min_LMD)/2.

The mid_LMP and mid_LMD may be stored in the wellbore trajectory lateral variables 216 for the wellbore 104 along with other lateral variables regarding the mid_LMP:

mid_lateral_data_point,
mid_lateral_latitude=latitude of mid_lateral_data_point,
mid_lateral_longitude=longitude of mid_lateral_data_point,
mid_lateral_MD=measured depth of mid_lateral_data_point,
mid_lateral_TVD=TVD of mid_lateral_data_point,
mid_lateral_inclination=inclination of mid_lateral_data_point,
mid_lateral_azimuth=azimuth of mid_lateral_data_point,
mid_lateral_northing=northing of mid_lateral_data_point, and
mid_lateral_easting=easting of mid_lateral_data_point.

Figure 10:
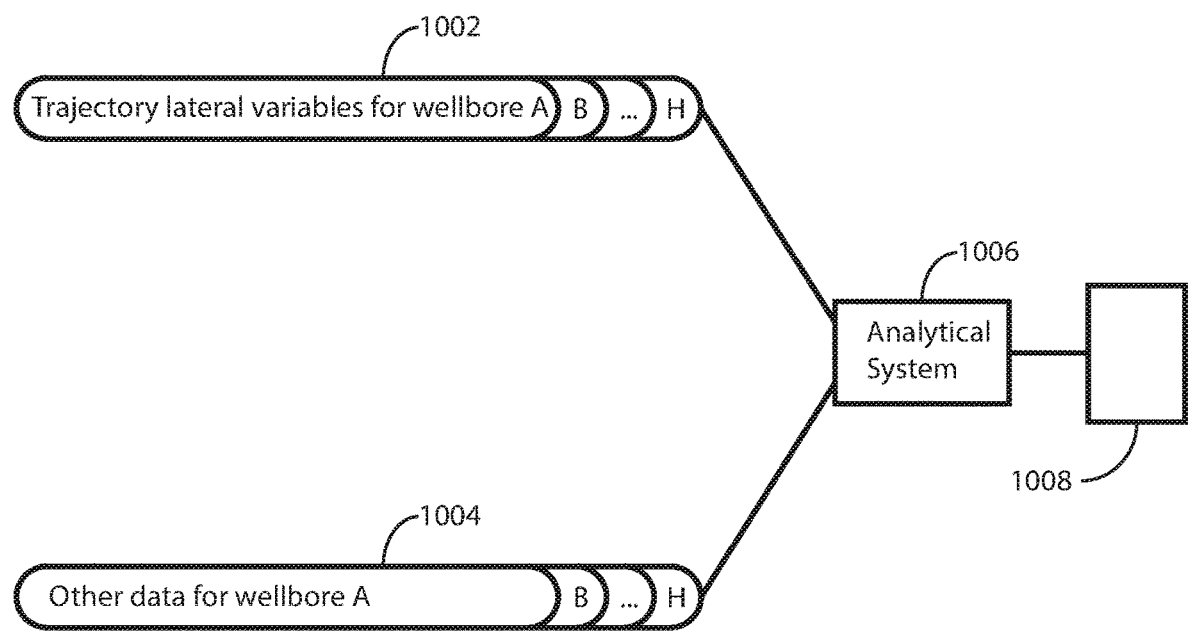
FIG. 10 illustrates use of the trajectory lateral variables.

FIG. 10 illustrates use of the trajectory lateral variables. In one or more embodiments, it is desired to do oilfield work in a region where there are already multiple wellbores (i.e., wellbores A through H; it will be understood that the number of wellbores is arbitrary and not limited to this number). Trajectory lateral variables 1002 for wellbores A through H (such as wellbore trajectory lateral variables 216), and other data 1004 (such as production data, reservoir data, treatment data, and well header data) for wellbores A through H are processed by an analytical system 1006 to produce a report 1008. The report 1008 is used as a consideration in recommending oil field work in the region.

Figure 11:
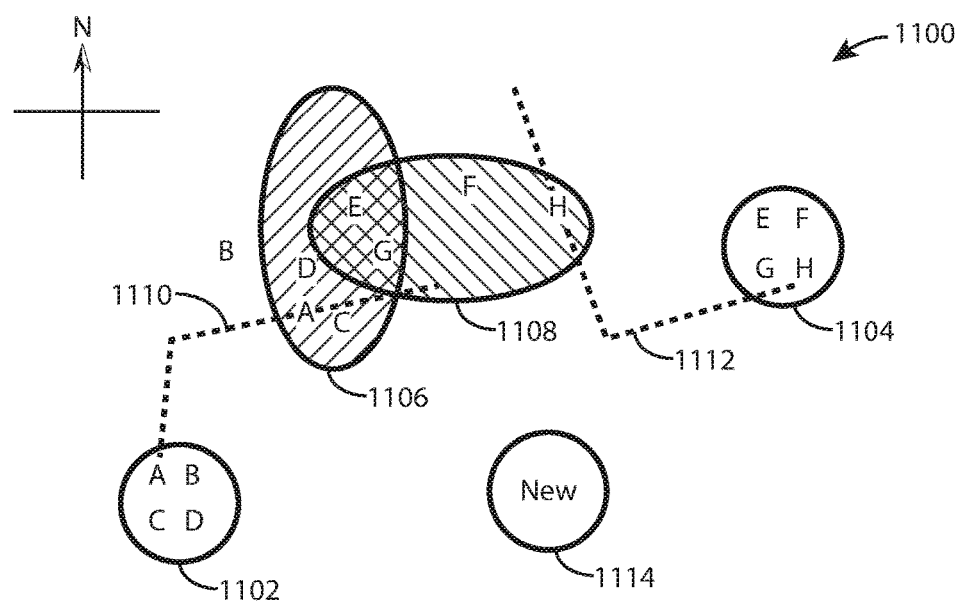
FIG. 11 is an overhead view of an oil field illustrating a use of mid-lateral points.

FIG. 11 is an overhead view of an oil field illustrating a use of mid-lateral points. An oil field 1100 includes two surface areas 1102 and 1104 from which lateral wells have been drilled. The surface locations of wells A, B, C, and D are in surface area 1102 and the surface locations of wells E, F, G, and H are in surface area 1104. The oil field 1100 includes two productive subsurface formations 1106 and 1108, which are cross-hatched to indicate that they are below the surface. The mid-lateral points for each of the wells A-H is shown superimposed over the formation 1106, 1108 from which it is intended to produce, except that it can be seen that the mid-lateral point for well B is not superimposed over either of the formations 1106, 1108. The wellbore for wells A and H, 1110 and 1112, respectively, are shown. The wellbores for wells C-D and E-G are not shown to avoid cluttering the figure. A compass in the upper-left-hand corner of FIG. 11 shows the geographical orientation of the objects on the figure.

Figure 12:
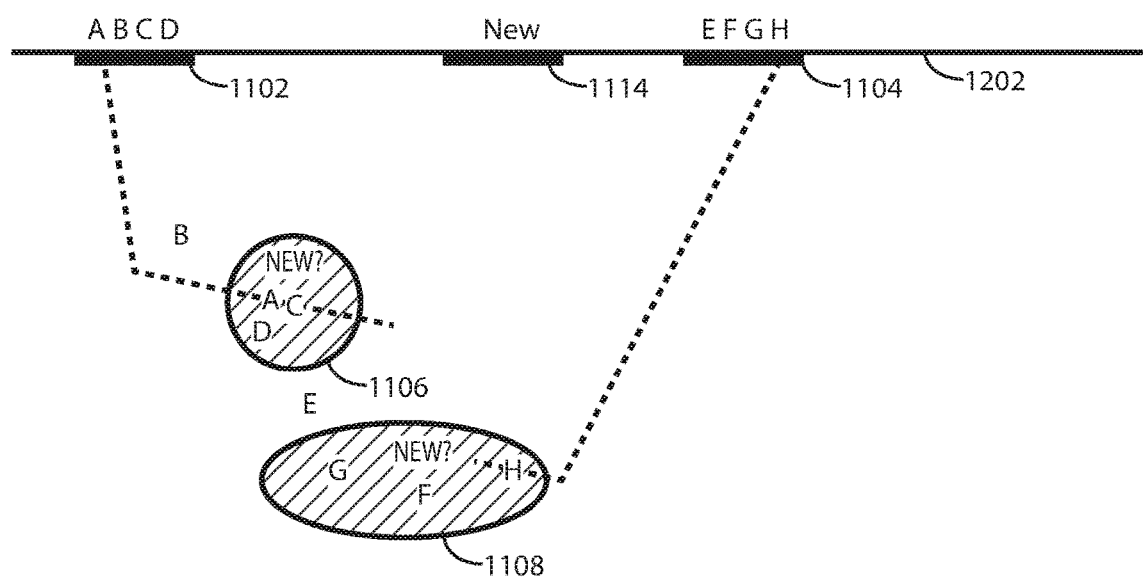
FIG. 12 is a cross-sectional view of the oil field of FIG. 11.

FIG. 12 is a cross-sectional view of the oil field of FIG. 11. The view in FIG. 12 is below ground facing North. The surface 1202 is shown as a horizontal line. The surface areas 1102, 1104, and 1114 are represented by thickening in the line representing the surface. The formations 1106, 1108 are shown in cross-section. Each mid-lateral point for the wells A-H are shown superimposed over formation 1106, 1108 from which it is intended to produce, except that it can be seen that the mid-lateral point for wells B and E are not superimposed over either of the formations 1106, 1108. As in FIG. 11, the wellbores for wells A and H, 1110 and 1112, respectively, are shown. The wellbores for wells C-D and E-G are not shown to avoid cluttering the figure.

It is desired to drill a new well, labeled "New" from a new surface area 1114 and guidance regarding the direction of the new well to be drilled is sought.

From the information shown in FIGS. 11 and 12, which is derived as described above in connection with FIGS. 1-9 and produced into a report 1010, a recommendation concerning the direction to drill the new well can be made. For example, it may be decided to drill the new well into formation 1106 to replace or augment production from well B. It may be decided to drill the new well into formation 1108 to replace or augment production from well E. It may be decided to drill the new well into formation 1106 and 1108 to replace or augment production from wells B and E.

Figure 13:
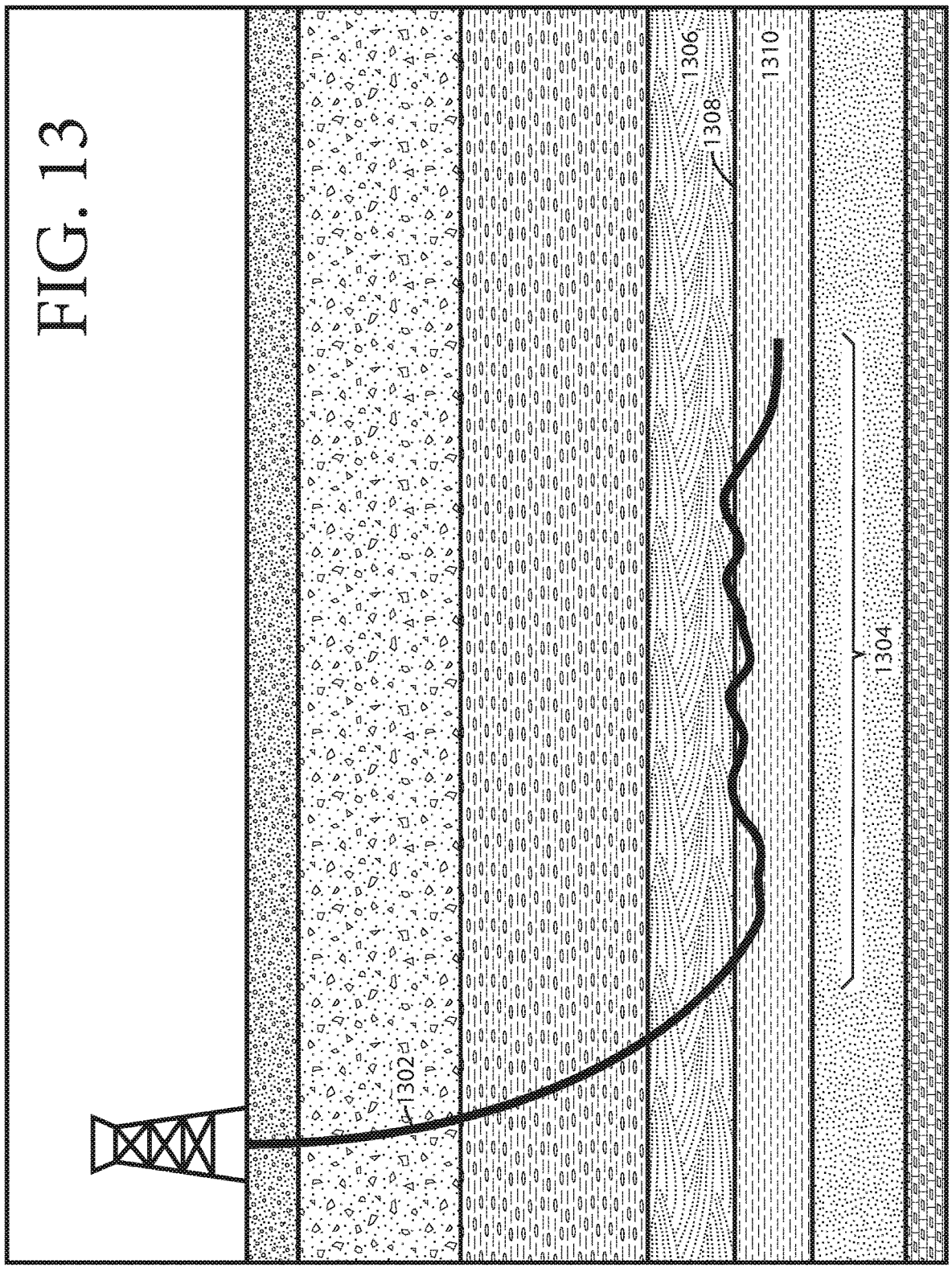
FIG. 13 is a cross-sectional view of a well exhibiting porpoising.

FIG. 13 is a cross-sectional view of a well exhibiting porpoising. The techniques described above can also be used to detect porpoising, as illustrated in FIG. 13. A wellbore 1302 may have a lateral section 1304 and may be intended to produce fluids from formation 1310. Formation 1306 may have a boundary 1308 that separates it from formation 1310.

Once a joined trajectory survey 212 and the wellbore trajectory lateral variables 216 of the wellbore 1302 have been established, the analytical system 1006 (see FIG. 10) may detect the "porpoising" shown in FIG. 13. That is, the analytical system 1006 may detect that the wellbore 1302 moves in and out of the productive formation 1310 (note that the same is true of formation 1306). Such movement may result in inconsistent production or low production from the productive formation 1310. Recognizing that movement such as that shown in FIG. 13 when it is contained entirely within the productive formation 1310 may not be a problem and may be desirable to expose the maximum amount of the productive formation 1310 to the borehole 1302, porpoising may be defined in several ways.

Porpoising is defined in one way as crossing the boundary of the productive formation 1310, in either direction (i.e. into or out of), at least a cross_threshold number of times within the lateral section. In one or more embodiments, the boundary of the productive formation 1310 is derived from analysis of geological or geophysical data and information regarding the productive formation 1310. In one or more embodiments cross_threshold=2. In one or more embodiments cross_threshold=5. In one or more embodiments cross_threshold=20.

Porpoising is defined in another way as determinations that (a) the beginning point of the lateral section 1304 of the borehole 1302 is within a threshold range of the boundary 1308 and (b) that the standard deviation of the inclination of the borehole 1302 is such that it is likely that the borehole 1302 crosses the boundary 1308 a number of times. More specifically, porpoising is found if the TVD of the survey point at the beginning of the lateral section 1304 (i.e., the survey point having measured depth=min_LMD) is within a lateral_TVD_threshold of the TVD of the boundary 1308 at the same latitude and longitude and the standard deviation of inclination within the lateral section, (lateral_STD_inclination) is greater than lateral_STD_inclination_threshold.

The analysis just described assumes that the boundary 1308 is horizontal. In one or more embodiments, the calculation is adjusted to account for the dip of the boundary 1308.

In one or more embodiments, lateral_TVD_threshold=6.6 feet (2 meters). In one or more embodiments, lateral_TVD_threshold=33 feet (10 meters). In one or more embodiments, lateral_TVD_threshold=66 feet (20 meters).

In one or more embodiments the lateral_STD_inclination_threshold is based on the lateral_TVD_threshold, the length of the lateral section 1304, and a constant. For example, in one or more embodiments, lateral_STD_inclination_threshold=$\sin^{-1}$(lateral_TVD_threshold/lateral_length)×constant. In one or more embodiments, the constant is 2. In one or more embodiments, the constant is 5. In one or more embodiments, the constant is 10. In one or more embodiments, lateral_STD_inclination_threshold=2 degrees. In one or more embodiments, lateral_STD_inclination_threshold=5 degrees. In one or more embodiments, lateral_STD_inclination_threshold=10 degrees.

Porpoising is defined in another way as a determination that (a) the beginning point of the lateral section 1304 of the borehole 1302 is within a threshold range of the boundary 1308 and (b) that a frequency domain representation of the trajectory of the lateral section 1304 of the borehole 1302, for example the result of a Fourier transform or a fast Fourier transform of a combination of the TVD and geographical position of the survey points, includes a peak having a magnitude greater by a factor of peak_magnitude_amplitude than an average of the magnitude of the frequency domain representation of the trajectory of the lateral section 1304 excluding the peak. In one or more embodiments, peak_magnitude_amplitude is 3 decibels. In one or more embodiments, peak_magnitude_amplitude is 4 decibels. In one or more embodiments, peak_magnitude_amplitude is 6 decibels.

Based on identification of porpoising, it may be decided to drill a new well into the productive formation 1310.

In one aspect, a method includes a processor acquiring a wellbore trajectory survey. The wellbore trajectory survey includes an ordered plurality of survey points. Each of the plurality of survey points has a measured depth, defined to be a distance along the wellbore from a drilling location on a surface or from a sea bed to a point in the wellbore corresponding to the survey point, an inclination, defined to be the angular deviation from vertical of the wellbore at the point in the wellbore corresponding to the survey point, and a geographic location of the point in the wellbore corresponding to the survey point. The wellbore trajectory survey is ordered on measured depth. The processor identifies a minimum lateral measured depth (min_LMD) as a measured depth of a first point in the ordered plurality of survey points for which the inclination exceeds an inclination threshold angle. The processor identifies a maximum lateral measured depth (max_LMD) as a measured depth of a last point in the ordered plurality of survey points for which the inclination exceeds the inclination threshold angle. The processor identifies a mid-lateral point (mid_LMP) in the plurality of survey points whose measured depth (mid_LMD) is greater than min_LMD and less than max_LMD. The method includes using the geographic location of the mid-lateral point to identify a location of the wellbore as a consideration in recommending oil field work in the vicinity of the wellbore.

Implementations may include one or more of the following. Acquiring the wellbore trajectory survey may include selecting a selected trajectory survey for the wellbore from among a plurality of candidate trajectory surveys for the wellbore, joining the selected trajectory survey for the wellbore with a well header data to produce a joined trajectory survey for the wellbore, and extracting additional trajectory features from the joined trajectory survey for the wellbore to produce the acquired wellbore trajectory survey. Selecting the selected trajectory survey for the borehole may include acquiring the plurality of candidate trajectory surveys for the wellbore, removing as a candidate trajectory survey a trajectory survey not having a horizontal_section_number of survey points consecutive in measured depth with an inclination greater than a horizontal_section_minimum_inclination, and selecting as the selected trajectory survey the candidate trajectory survey having a survey point with the maximum measured depth of the survey points in the candidate trajectory surveys and having the largest number of survey points. Joining the selected trajectory survey for the wellbore with the well header data may include determining a geographic location of a trajectory-surface point in the selected trajectory survey for which the measured depth is zero, determining a geographic location of a well header-surface location, determining that the geographic location of the trajectory-surface point is within a surface-location threshold of the geographic location of the well header-surface location, and, as a result, joining the selected trajectory survey for the borehole with the well header data to produce the joined trajectory survey for the wellbore. Extracting additional trajectory features from the joined trajectory survey for the wellbore may include computing measured depth statistics, computing perforation statistics, computing inclination statistics, computing azimuth statistics, computing true vertical depth (TVD) statistics, and computing toe position. Computing perforation statistics may include setting lower_perf to a measured depth of a survey point having a maximum measured depth of a perforated set of survey points in the joined trajectory survey corresponding to a perforated section of the wellbore, setting upper_perf to a measured depth of a survey point having a minimum measured depth of the perforated set of survey points in the joined trajectory survey, flagging lower_perf as true if max_LMD−lower_perf<0 and otherwise flagging lower_perf as false, flagging upper_perf as true if min_LMD−upper_perf>0 and otherwise flagging upper_perf as false, setting MD_diff_from_upper_perf_to_first_lateral_point=upper_perf−min_LMD, setting MD_diff_from_lower_perf_to_last_lateral_point=lower_perf−max_LMD, and terminating the method if MD_diff_from_lower_perf_to_last_lateral_point≥a lower_perf_threshold. Computing inclination statistics may include computing Lateral_Inc_Std as the standard deviation of the inclination of the survey points in the joined trajectory survey having measured depths≥min_LMD and ≤max_LMD. If Lateral_Inc_Std>Lateral_Inc_Std_threshold, computing inclination statistics may include cleaning the joined trajectory survey, re-computing max_LMD, re-computing min_LMD, and re-computing Lateral_Inc_Std. Computing inclination statistics may include computing MD_Std_Dev as the standard deviation of the measured depths of the survey points in the joined trajectory survey having measured depths≥min_LMD and ≤max_LMD, computing lateral_length=max_LMD−min_LMD, computing a lateral_skewness of inclination, computing a lateral_kurtosis of inclination, computing a lateral_average of inclination as the mean of lateral inclination, computing a 25% quartile of inclination, computing a 50% quartile of inclination as the median of lateral inclination, computing a 75% quartile of inclination, and computing inc_diff_from_upper_perf_to_first_lateral=inclination for survey point having a measured depth equal to or closest to upper_perf−inclination for survey point having a measured depth equal to min_LMD. Computing azimuth statistics may include computing lateral_az_avg=average of azimuths for survey points in the joined trajectory survey having measured depths≥min_LMD and ≤max_LMD and computing lateral_az_std=standard deviation of azimuths for survey points in the joined trajectory survey having measured depths≥min_LMD and ≤max_LMD. Computing TVD statistics may include computing sub_sea_TVD for each survey point=true vertical depth (TVD) for the survey point−reference elevation, computing Lateral_TVD_Std=standard deviation of TVD for survey points in the joined trajectory survey having measured depths≥min_LMD and ≤max_LMD, and computing Lateral_TVD_Diff=TVD for survey points having a measured depth equal to max_LMD−TVD for survey point having a measured depth equal to min_LMD. Computing toe position may include computing toe_position as toe_up if Lateral_TVD_Diff<−toe_constant, toe_down if Lateral_TVD_Diff>toe_constant, or toe_flat if −toe_constant<=Lateral_TVD_Diff<=toe_constant. Identifying a mid-lateral point in the plurality of survey points uses a calculation selected from the group consisting of computing mid lateral measured depth=min_LMD+(max_LMD−min_LMD)/2, computing mid_lateral_data_point=survey point having the measured depth produced by the function min(|measured depth−mid_LMD| for all survey points having measured depths≥min_LMD and ≤max_LMD), computing mid_lateral_data_point=survey point having the measured depth produced by the function min(|measured depth−mid_LMD| for all survey points having measured depths≥min_LMD+(max_LMD−min_LMD)/2), and computing mid_lateral_data_point=survey point having the measured depth produced by the function min(|measured depth−mid_LMD| for all survey points having measured depths<=min_LMD+(max_LMD−min_LMD)/2).

In one aspect, a computer program is recorded on a non-transitory computer-readable medium. The computer program includes executable instructions, that, when executed, perform a method. The method includes acquiring a wellbore trajectory survey. The wellbore trajectory survey includes an ordered plurality of survey points. Each of the plurality of survey points has a measured depth, defined to be a distance along the wellbore from a drilling location on a surface or from a sea bed to a point in the wellbore corresponding to the survey point, an inclination, defined to be the angular deviation from vertical of the wellbore at the point in the wellbore corresponding to the survey point, and a geographic location of the point in the wellbore corresponding to the survey point. The wellbore trajectory survey is ordered on measured depth. The method includes identifying a minimum lateral measured depth (min_LMD) as a measured depth of a first point in the ordered plurality of survey points for which the inclination exceeds an inclination threshold angle. The method includes identifying a maximum lateral measured depth (max_LMD) as a measured depth of a last point in the ordered plurality of survey points for which the inclination exceeds the inclination threshold angle. The method includes identifying a mid-lateral point (mid_LMP) in the plurality of survey points whose measured depth (mid_LMD) is greater than min_LMD and less than max_LMD. The method includes using the geographic location of the mid-lateral point to identify a location of the wellbore as a consideration in recommending oil field work in the vicinity of the wellbore.

The operations of the flow diagrams are described with references to the systems/apparatus shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

The word "coupled" herein means a direct connection or an indirect connection.

The text above describes one or more specific embodiments of a broader invention. The invention also is carried out in a variety of alternate embodiments and thus is not limited to those described here. The foregoing description of an embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method comprising:
a processor acquiring a wellbore trajectory survey, wherein the wellbore trajectory survey comprises an ordered plurality of survey points, each of the plurality of survey points having:
a measured depth, defined to be a distance along the wellbore from a drilling location on a surface or from a sea bed to a point in the wellbore corresponding to the survey point,
an inclination, defined to be the angular deviation from vertical of the wellbore at the point in the wellbore corresponding to the survey point, and
a geographic location of the point in the wellbore corresponding to the survey point, wherein the wellbore trajectory survey is ordered on measured depth;
the processor identifying a minimum lateral measured depth (min_LMD) as a measured depth of a first point in the ordered plurality of survey points for which the inclination exceeds an inclination threshold angle;
the processor identifying a maximum lateral measured depth (max_LMD) as a measured depth of a last point in the ordered plurality of survey points for which the inclination exceeds the inclination threshold angle;
the processor identifying a mid-lateral point (mid_LMP) in the plurality of survey points whose measured depth (mid_LMD) is greater than min_LMD and less than max_LMD; and
using the geographic location of the mid-lateral point to identify a location of the wellbore as a consideration in recommending oil field work in the vicinity of the wellbore.

2. The method of claim 1 wherein acquiring the wellbore trajectory survey comprises:
selecting a selected trajectory survey for the wellbore from among a plurality of candidate trajectory surveys for the wellbore;
joining the selected trajectory survey for the wellbore with a well header data to produce a joined trajectory survey for the wellbore; and
extracting additional trajectory features from the joined trajectory survey for the wellbore to produce the acquired wellbore trajectory survey.

3. The method of claim 2 wherein selecting the selected trajectory survey for the borehole comprises: acquiring the plurality of candidate trajectory surveys for the wellbore; removing as a candidate trajectory survey a trajectory survey not having a horizontal_section_number of survey points consecutive in measured depth with an inclination greater than a horizontal_section_minimum_inclination; and
selecting as the selected trajectory survey the candidate trajectory survey having a survey point with the maximum measured depth of the survey points in the candidate trajectory surveys and having the largest number of survey points.

4. The method of claim 2 wherein joining the selected trajectory survey for the wellbore with the well header data comprises:
determining a geographic location of a trajectory-surface point in the selected trajectory survey for which the measured depth is zero;
determining a geographic location of a well header-surface location;
determining that the geographic location of the trajectory-surface point is within a surface-location threshold of the geographic location of the well header-surface location; and, as a result joining the selected trajectory survey for the borehole with the well header data to produce the joined trajectory survey for the wellbore.

5. The method of claim 2 wherein extracting additional trajectory features from the joined trajectory survey for the wellbore comprises:
computing measured depth statistics;
computing perforation statistics;
computing inclination statistics;
computing azimuth statistics;
computing true vertical depth (TVD) statistics; and
computing toe position.

6. The method of claim 5 wherein computing perforation statistics comprises:
setting lower_perf to a measured depth of a survey point having a maximum measured depth of a perforated set of survey points in the joined trajectory survey corresponding to a perforated section of the wellbore;
setting upper_perf to a measured depth of a survey point having a minimum measured depth of the perforated set of survey points in the joined trajectory survey;
flagging lower_perf as true if max_LMD−lower_perf<0 and otherwise flagging lower_perf as false;
flagging upper_perf as true if min_LMD−upper_perf>0 and otherwise flagging upper_perf as false;
setting MD_diff_from_upper_perf_to_first_lateral_point=upper_perf−min_LMD; setting MD_diff_from_lower_perf_to_last_lateral_point=lower_perf−max_LMD; and
terminating the method if MD_diff_from_lower_perf_to_last_lateral_point≥a lower_perf_threshold.

7. The method of claim 5 wherein computing inclination statistics comprises:
computing Lateral_Inc_Std as the standard deviation of the inclination of the survey points in the joined trajectory survey having measured depths≥min_LMD and ≤max_LMD;
if Lateral_Inc_Std>Lateral_Inc_Std threshold
cleaning the joined trajectory survey,
re-computing max_LMD,
re-computing min_LMD, and re-computing Lateral_Inc_Std;
computing MD_Std_Dev as the standard deviation of the measured depths of the survey points in the joined trajectory survey having measured depths≥min_LMD and ≤max_LMD;
computing lateral length=max_LMD−min_LMD; computing a lateral_skewness of inclination; computing a lateral_kurtosis of inclination;
computing a lateral average of inclination as the mean of lateral inclination;
computing a 25% quartile of inclination;
computing a 50% quartile of inclination as the median of lateral inclination; computing a 75% quartile of inclination; and
computing inc_diff_from_upper_perf_to_first_lateral=inclination for survey point having a measured depth equal to or closest to upper_perf−inclination for survey point having a measured depth equal to min_LMD.

8. The method of claim 5 wherein computing azimuth statistics comprises:
computing lateral_az_avg=average of azimuths for survey points in the joined trajectory survey having measured depths≥min_LMD and ≤max_LMD; and
computing lateral_az_std=standard deviation of azimuths for survey points in the joined trajectory survey having measured depths≥min_LMD and ≤max_LMD;
wherein computing TVD statistics comprises:
computing sub_sea_TVD for each survey point=true vertical depth (TVD) for the survey point–reference elevation;
computing Lateral_TVD_Std=standard deviation of TVD for survey points in the joined trajectory survey having measured depths≥min_LMD and ≤max_LMD; and
computing Lateral_TVD_Diff=TVD for survey point having a measured depth equal to max_LMD–TVD for survey points having a measured depth equal to min_LMD; wherein computing toe position comprises:
computing toe_position as toe_up if Lateral_TVD_Diff<–toe_constant, toe_down if Lateral_TVD_Diff>toe_constant, or toe_flat if –toe_contant<=Lateral_TVD_Diff<=toe_constant.

9. The method of claim 1 wherein identifying a mid-lateral point in the plurality of survey points uses a calculation selected from the group consisting of:
computing mid_lateral_measured_depth=min_LMD+(max_LMD–min_LMD)/2, computing mid_lateral_data_point=survey point having the measured depth produced by the function min(|measured depth–mid_LMD| for all survey points having measured depths≥min_LMD and ≤max_LMD),
computing mid_lateral_data_point=survey point having the measured depth produced by the function min (|measured depth–mid_LMD| for all survey points having measured depths≥min_LMD+(max_LMD–min_LMD)/2), and
computing mid_lateral_data_point=survey point having the measured depth produced by the function min (|measured depth–mid_LMD| for all survey points having measured depths<=min_LMD+(max_LMD–min_LMD)/2).

10. A non-transitory computer-readable medium on which is recorded a computer program, the computer program comprising executable instructions, that, when executed, perform a method comprising:
acquiring a wellbore trajectory survey, wherein the wellbore trajectory survey comprises an ordered plurality of survey points, each of the plurality of survey points having:
a measured depth, defined to be a distance along the wellbore from a drilling location on a surface or from a sea bed to a point in the wellbore corresponding to the survey point,
an inclination, defined to be the angular deviation from vertical of the wellbore at the point in the wellbore corresponding to the survey point, and
a geographic location of the point in the wellbore corresponding to the survey point,
wherein the wellbore trajectory survey is ordered on measured depth;
identifying a minimum lateral measured depth (min_LMD) as a measured depth of a first point in the ordered plurality of survey points for which the inclination exceeds an inclination threshold angle;
identifying a maximum lateral measured depth (max_LMD) as a measured depth of a last point in the ordered plurality of survey points for which the inclination exceeds the inclination threshold angle;
identifying a mid-lateral point (mid_LMP) in the plurality of survey points whose measured depth (mid_LMD) is greater than min_LMD and less than max_LMD; and
using the geographic location of the mid-lateral point to identify a location of the wellbore as a consideration in recommending oil field work in the vicinity of the wellbore.

11. The computer-readable medium of claim 10 wherein acquiring the wellbore trajectory survey comprises:
selecting a selected trajectory survey for the wellbore from among a plurality of candidate trajectory surveys for the wellbore;
joining the selected trajectory survey for the wellbore with a well header data to produce a joined trajectory survey for the wellbore; and
extracting additional trajectory features from the joined trajectory survey for the wellbore to produce the acquired wellbore trajectory survey.

12. The computer-readable medium of claim 11 wherein selecting the selected trajectory survey for the borehole comprises:
acquiring the plurality of candidate trajectory surveys for the wellbore;
removing as a candidate trajectory survey a trajectory survey not having a horizontal_section_number of survey points consecutive in measured depth with an inclination greater than a horizontal_section_minimum_inclination; and
selecting as the selected trajectory survey the candidate trajectory survey having a survey point with the maximum measured depth of the survey points in the candidate trajectory surveys and having the largest number of survey points.

13. The computer-readable medium of claim 11 wherein joining the selected trajectory survey for the wellbore with the well header data comprises:
determining a geographic location of a trajectory-surface point in the selected trajectory survey for which the measured depth is zero;
determining a geographic location of a well header-surface location;
determining that the geographic location of the trajectory-surface point is within a surface-location threshold of the geographic location of the well header-surface location; and, as a result
joining the selected trajectory survey for the borehole with the well header data to produce the joined trajectory survey for the wellbore.

14. The computer-readable medium of claim 11 wherein extracting additional trajectory features from the joined trajectory survey for the wellbore comprises:
computing measured depth statistics;
computing perforation statistics;
computing inclination statistics;
computing azimuth statistics;
computing true vertical depth (TVD) statistics; and
computing toe position.

15. The computer-readable medium of claim 14 wherein computing perforation statistics comprises: setting lower_perf to a measured depth of a survey point having a maximum measured depth of a perforated set of survey points in the joined trajectory survey corresponding to a perforated section of the wellbore;

setting upper_perf to a measured depth of a survey point having a minimum measured depth of the perforated set of survey points in the joined trajectory survey;

flagging lower_perf as true if max_LMD−lower_perf<0 and otherwise flagging lower_perf as false;

flagging upper_perf as true if min_LMD−upper_perf>0 and otherwise flagging upper_perf as false;

setting MD_diff_from_upper_perf_to_first_lateral_point=upper_perf−min_LMD; setting MD_diff_from_lower_perf_to_last_lateral_point=lower_perf−max_LMD; and terminating the method if MD_diff_from_lower_perf_to_last_lateral_point≥a lower_perf_threshold.

16. The computer-readable medium of claim 14 wherein computing inclination statistics comprises: computing Lateral_Inc_Std as the standard deviation of the inclination of the survey points in the joined trajectory survey having measured depths≥min_LMD and ≤max_LMD; if Lateral_Inc_Std>Lateral_Inc_Std_threshold:

cleaning the joined trajectory survey, re-computing max_LMD, re-computing min_LMD, and re-computing Lateral_Inc_Std;

computing MD_Std_Dev as the standard deviation of the measured depths of the survey points in the joined trajectory survey having measured depths≥min_LMD and ≤max_LMD;

computing lateral_length=max_LMD−min_LMD;

computing a lateral_skewness of inclination;

computing a lateral_kurtosis of inclination;

computing a lateral average of inclination as the mean of lateral inclination;

computing a 25% quartile of inclination;

computing a 50% quartile of inclination as the median of lateral inclination;

computing a 75% quartile of inclination; and computing inc_diff_from_upper_perf_to_first_lateral=inclination for survey point having a measured depth equal to or closest to upper_perf−inclination for survey point having a measured depth equal to min_LMD.

17. The computer-readable medium of claim 14 wherein computing azimuth statistics comprises: computing lateral_az_avg=average of azimuths for survey points in the joined trajectory survey having measured depths≥min_LMD and ≤max_LMD; and computing lateral_az_std=standard deviation of azimuths for survey points in the joined trajectory survey having measured depths≥min_LMD and ≤max_LMD;

wherein computing TVD statistics comprises:

computing sub_sea_TVD for each survey point=true vertical depth (TVD) for the survey point−reference elevation;

computing Lateral_TVD_Std=standard deviation of TVD for survey points in the joined trajectory survey having measured depths≥min_LMD and ≤max_LMD; and computing Lateral_TVD_Diff=TVD for survey point having a measured depth equal to max_LMD−TVD for survey point having a measured depth equal to min_LMD;

wherein computing toe position comprises:

computing toe_position as toe_up if Lateral_TVD_Diff<−toe_constant, toe_down if Lateral_TVD_Diff>toe_constant, or toe_flat if −toe_contant<=Lateral_TVD_Diff<=toe_constant.

18. The computer-readable medium of claim 10 wherein identifying a mid-lateral point in the plurality of survey points using a calculation selected from the group consisting of:

computing mid_lateral_measured_depth=min_LMD+(max_LMD−min_LMD)/2, computing mid_lateral_data_point=survey point having the measured depth produced by the function min(|measured depth−mid_LMD| for all survey points having measured depths≥min_LMD and ≤max_LMD), computing mid_lateral_data_point=survey point having the measured depth produced by the function min(|measured depth−mid_LMD| for all survey points having measured depths≥min_LMD+(max_LMD−min_LMD)/2), and computing mid_lateral_data_point=survey point having the measured depth produced by the function min(|measured depth−mid_LMD| for all survey points having measured depths<=min_LMD+(max_LMD−min_LMD)/2).

\* \* \* \* \*